(12) United States Patent
Wang et al.

(10) Patent No.: US 11,864,204 B2
(45) Date of Patent: *Jan. 2, 2024

(54) TERMINAL AND COMMUNICATION METHOD

(71) Applicant: Panasonic Intellectual Property Corporation of America, Torrance, CA (US)

(72) Inventors: Lilei Wang, Beijing (CN); Kazuki Takeda, Kanagawa (JP); Ayako Horiuchi, Kanagawa (JP); Alexander Golitschek Edler Von Elbwart, Hessen (DE); Masayuki Hoshino, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,653

(22) Filed: Nov. 21, 2022

(65) Prior Publication Data
US 2023/0107098 A1 Apr. 6, 2023

Related U.S. Application Data

(63) Continuation of application No. 17/131,286, filed on Dec. 22, 2020, now Pat. No. 11,540,265, which is a
(Continued)

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0048* (2013.01); *H04L 5/0094* (2013.01);
(Continued)

(58) Field of Classification Search
CPC . H04L 5/0035; H04L 5/0023; H04L 25/0226; H04L 5/0094; H04L 5/0048; H04W 16/32; H04W 72/042
See application file for complete search history.

(56) References Cited

U.S. PATENT DOCUMENTS 8,934,431 B2   1/2015   Xu et al.
2011/0128942 A1   6/2011   Kim et al.
(Continued)

FOREIGN PATENT DOCUMENTS

CN   101882980 A   11/2010
CN   102149082 A   8/2011
(Continued)

OTHER PUBLICATIONS

3GPP TS 36.211 V11.1.0, "3rd Generation Partnership Project; Technical Specification Group Radio Access Network; Evolved Universal Terrestrial Radio Access (E-UTRA); Physical Channels and Modulation (Release 11)," Dec. 2012. (108 pages).
(Continued)

*Primary Examiner* — Ajay Cattungal
(74) *Attorney, Agent, or Firm* — Seed IP Law Group LLP

(57) ABSTRACT

The present disclosure aims at allowing a demodulation reference signal (DMRS) pattern suitable for a terminal to be selected from among a plurality of DMRS patterns including Legacy DMRS and Reduced DMRS. Disclosed is a terminal including: reception section 21 that receives uplink control information; control section 23 that determines a specific mapping pattern from among a plurality of mapping patterns for an uplink DMRS on the basis of the control information; and DMRS generating section 24 that generates a DMRS according to the specific mapping pattern.

18 Claims, 28 Drawing Sheets

Related U.S. Application Data continuation of application No. 16/691,251, filed on Nov. 21, 2019, now Pat. No. 10,912,075, which is a continuation of application No. 16/109,331, filed on Aug. 22, 2018, now Pat. No. 10,531,448, which is a continuation of application No. 15/808,352, filed on Nov. 9, 2017, now Pat. No. 10,085,252, which is a continuation of application No. 14/777,702, filed as application No. PCT/CN2013/073590 on Apr. 1, 2013, now Pat. No. 9,844,046.

(51) Int. Cl.
*H04L 25/02* (2006.01)
*H04W 16/32* (2009.01)

(52) U.S. Cl.
CPC ......... *H04L 25/0226* (2013.01); *H04W 16/32* (2013.01); *H04L 5/0023* (2013.01); *H04L 5/0035* (2013.01)

(56) References Cited

U.S. PATENT DOCUMENTS

| | | | |
|---|---|---|---|
| 2011/0200135 A1* | 8/2011 | Sorrentino | H04L 27/2613 375/295 |
| 2012/0051319 A1 | 3/2012 | Kwon et al. | |
| 2012/0307768 A1* | 12/2012 | Xu | H04L 5/0051 370/329 |
| 2013/0028207 A1* | 1/2013 | Okubo | H04L 1/0031 370/329 |
| 2013/0195025 A1 | 8/2013 | Chatterjee et al. | |
| 2013/0322280 A1* | 12/2013 | Pi | H04W 56/0005 370/252 |
| 2014/0286255 A1* | 9/2014 | Nam | H04L 27/2636 370/329 |
| 2014/0293881 A1 | 10/2014 | Khoshnevis et al. | |
| 2014/0301316 A1* | 10/2014 | Sorrentino | H04L 5/0048 370/329 |
| 2015/0003351 A1 | 1/2015 | Park et al. | |
| 2015/0071196 A1* | 3/2015 | Park | H04W 72/21 370/329 |
| 2016/0057753 A1 | 2/2016 | Yang et al. | |
| 2016/0100398 A1* | 4/2016 | Xia | H04L 5/0007 370/330 |
| 2016/0192385 A1 | 6/2016 | Tooher et al. | |
| 2016/0211958 A9* | 7/2016 | Sorrentino | H04L 27/2613 |
| 2016/0294524 A1* | 10/2016 | Sorrentino | H04L 5/0048 |

FOREIGN PATENT DOCUMENTS

| | | |
|---|---|---|
| CN | 102413572 A | 4/2012 |
| JP | 2011077647 A | 4/2011 |
| JP | 2013034214 A | 2/2013 |
| WO | WO 2012152004 A1 | 11/2012 |
| WO | WO 2013019031 A2 | 2/2013 |
| WO | WO 2013086946 A1 | 6/2013 |
| WO | WO 2013107264 A1 | 7/2013 |
| WO | WO 2014113546 A1 | 7/2014 |
| WO | WO 2014155198 A2 | 10/2014 |
| WO | WO 2014155899 A1 | 10/2014 |

OTHER PUBLICATIONS

3GPP TS 36.212 V11.1.0, "3rd Generation Partnership Project; Technical Specification Group Radio Access Network; Evolved Universal Terrestrial Radio Access (E-UTRA); Multiplexing and channel coding (Release 11)," Dec. 2012. (82 pages).

3GPP TS 36.213 V11.1.0, "3rd Generation Partnership Project; Technical Specification Group Radio Access Network; Evolved Universal Terrestrial Radio Access (E-UTRA); Physical layer procedures (Release 11)," Dec. 2012. (160 pages).

3GPP TR 36.932 V12.0.0, "3rd Generation Partnership Project; Technical Specification Group Radio Access Network; Scenarios and Requirements for Small Cell Enhancements for E-UTRA and E-UTRAN (Release 12)," Dec. 2012. (14 pages).

China Telecom, "Discussion on spectral efficiency improvement for small cell enhancements," R1-130354, 3GPP TSG RAN WG1 Meeting #72, Agenda Item: 7.3.5.2, St. Julian's, Malta, Jan. 28-Feb. 1, 2013. (6 pages).

Ericsson, ST-Ericsson, "Details on UL DMRS," R1-120882, 3GPP TSG RAN WG1 Meeting #68, Agenda Item: 7.5.6.1.1, Dresden, Germany, Feb. 6-10, 2012. (7 pages).

Ericsson, ST-Ericsson, "Uplink DMRS Resource Configuration," R1-105688, 3GPP TSG RAN WG1 Meeting #62bis, Agenda Item: 6.5.1.1, Xi' An, China, Oct. 11-15, 2010. (10 pages).

International Search Report dated Jan. 9, 2014, for corresponding International Application No. PCT/CN2013/073590. (2 pages).

Nokia et al., "Evaluation Assumptions on Schemes to Enhance Small Cell Spectral Efficiency," R1-130491, Agenda Item: 7.3.5.2, 3GPP TSG RAN WG1 Meeting #72, St. Julian's, Malta, Jan. 28-Feb. 1, 2013. (4 pages).

Qualcomm Incorporated, "Overhead Reduction," R1-130594, Agenda Item: 7.3.5.2, 3GPP TSG RAN WG1 #72, St. Julian's, Malta, Jan. 28-Feb. 1, 2013. (4 pages).

ZTE, "Evaluation on the Uplink DMRS Overhead Reduction of Small Cells," R1-130139, Agenda item: 7.3.5.2 Enhancements for improved spectral efficiency, 3GPP TSG-RAN WG1 #72, Malta, Jan. 28-Feb. 1, 2013. (4 pages).

* cited by examiner

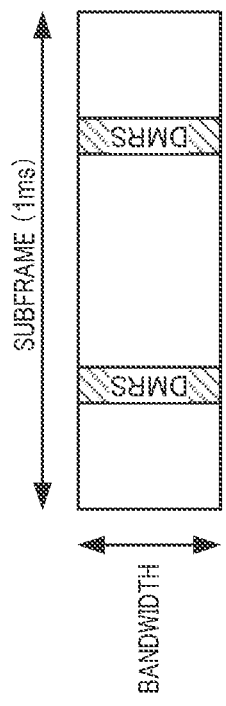
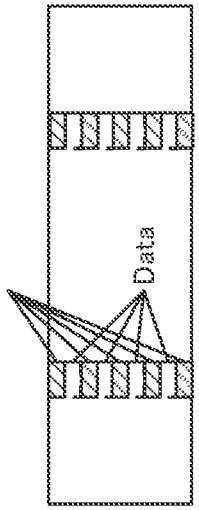
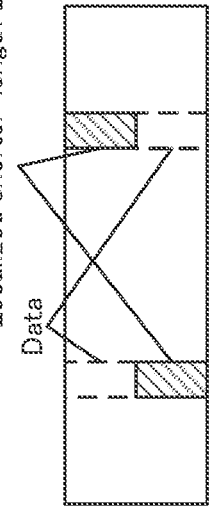
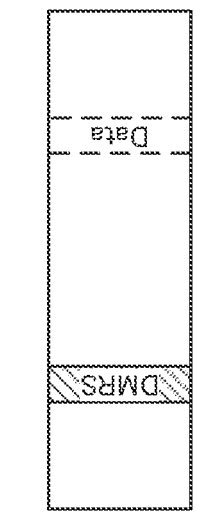
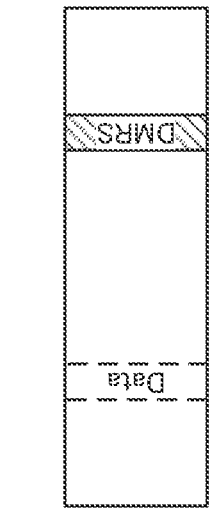

| Value of DMRS pattern indicator | DMRS pattern |
|---|---|
| 00 | Legacy DMRS |
| 01 | Reduced DMRS (Pattern 1) |
| 10 | Reduced DMRS (Pattern 2) |
| 11 | Reduced DMRS (Pattern 3) |

FIG. 11

| Value of DMRS pattern indicator | DMRS pattern | Virtual cell ID |
|---|---|---|
| 00 | Legacy DMRS | Same as PCID |
| 01 | Reduced DMRS (Pattern 1) | Same as PCID |
| 10 | Reduced DMRS (Pattern 2) | VCID 1 |
| 11 | Reduced DMRS (Pattern 3) | VCID 2 |

FIG. 12

| Value of DMRS pattern indicator | DMRS pattern | Base sequence group hopping |
|---|---|---|
| 00 | Legacy DMRS | ON |
| 01 | Legacy DMRS | OFF |
| 10 | Reduced DMRS (Pattern 1) | ON |
| 11 | Reduced DMRS (Pattern 2) | OFF |

FIG. 13

| Value of $L_{CRBs}$ | DMRS pattern |
|---|---|
| 1~2 ($x_1$=2) | Legacy DMRS |
| 3~8 ($x_2$=8) | Reduced DMRS (Pattern 1) |
| 9~15 ($x_3$=15) | Reduced DMRS (Pattern 2) |
| 16~25 | Reduced DMRS (Pattern 3) |

FIG. 19

| Value of $RB_{START}$ | DMRS pattern |
|---|---|
| 0~10 ($y_1$=10) | Reduced DMRS (Pattern 3) |
| 11~15 ($y_2$=15) | Reduced DMRS (Pattern 2) |
| 16~20 ($y_3$=20) | Reduced DMRS (Pattern 1) |
| 21~25 | Legacy DMRS |

FIG. 21

| Value of SRS request field | A-SRS | DMRS pattern |
|---|---|---|
| 0 | No trigger | Legacy DMRS |
| 1 | Trigger the A-SRS with the 1st SRS parameter set configured by higher layers | Reduced DMRS (Pattern 1) |

FIG. 23A

| Value of SRS request field | A-SRS | DMRS pattern |
|---|---|---|
| 00 | No trigger | Legacy DMRS |
| 01 | Trigger the A-SRS with the 1st SRS parameter set configured by higher layers | Reduced DMRS (Pattern 1) |
| 10 | Trigger the A-SRS with the 2nd SRS parameter set configured by higher layers | Legacy DMRS |
| 11 | No trigger | Reduced DMRS (Pattern 2) |

FIG. 23B

| Control channel in which UL grant is transmitted | DMRS pattern |
|---|---|
| PDCCH | Legacy DMRS |
| EPDCCH set 1 | Legacy DMRS |
| EPDCCH set 2 | Reduced DMRS (Pattern 1) |
| EPDCCH set 3 | Reduced DMRS (Pattern 2) |

FIG. 24

| Value of CS field | Value of Cyclic Shift | | | | OCC index | | | | DMRS pattern |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | 0 | 0 | 1 | 1 | Legacy DMRS |
| 001 | 6 | 0 | 9 | 3 | 1 | 1 | 0 | 0 | Legacy DMRS |
| 010 | 3 | 9 | 6 | 0 | 1 | 1 | 0 | 0 | Legacy DMRS |
| 011 | 4 | 10 | 7 | 1 | 0 | 0 | 0 | 0 | Reduced DMRS (Pattern 1) |
| 100 | 2 | 8 | 5 | 11 | 0 | 0 | 0 | 0 | Reduced DMRS (Pattern 1) |
| 101 | 8 | 2 | 11 | 5 | 1 | 1 | 1 | 1 | Reduced DMRS (Pattern 2) |
| 110 | 10 | 4 | 1 | 7 | 1 | 1 | 1 | 1 | Reduced DMRS (Pattern 2) |
| 111 | 9 | 3 | 0 | 6 | 0 | 0 | 1 | 1 | Legacy DMRS |

FIG. 25

| Value of CS field | Value of Cyclic Shift | | | | OCC index | | | | DMRS pattern |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | 0 | 0 | 1 | 1 | Legacy DMRS |
| 001 | 6 | 0 | 9 | 3 | 1 | 1 | 0 | 0 | Legacy DMRS |
| 010 | 3 | 9 | 6 | 0 | 1 | 1 | 0 | 0 | Legacy DMRS |
| 011 | 4 | 10 | 7 | 1 | 0 | 0 | 0 | 0 | Reduced DMRS (Pattern 1) |
| 100 | 2 | 8 | 5 | 11 | 0 | 0 | 0 | 0 | Reduced DMRS (Pattern 1) |
| 101 | 8 | 2 | 11 | 5 | 1 | 1 | 1 | 1 | Reduced DMRS (Pattern 2) |
| 110 | 10 | 4 | 1 | 7 | 1 | 1 | 1 | 1 | Reduced DMRS (Pattern 2) |
| 111 | 9 | 3 | 0 | 6 | 0 | 0 | 1 | 1 | Legacy DMRS |

FIG. 26

TERMINAL AND COMMUNICATION METHOD

BACKGROUND

Technical Field

The present disclosure relates to a terminal, a base station, a method of generating a DMRS, and a transmission method.

Description of the Related Art

Long Term Evolution (LTE) Release 8 (Rel. 8) that has been standardized by 3rd Generation Partnership Project Radio Access Network (3GPP) has adopted single-carrier frequency-division multiple-access (SC-FDMA) as an uplink communication scheme (see, Non-Patent Literatures (hereinafter, abbreviated as "NPL") 1, 2, and 3). SC-FDMA provides a low Peak-to-Average Power Ratio (PARP) and high power usage efficiency for terminals (User Equipment (UE)).

In the uplink of LTE, both data signals (Physical Uplink Shared Channel (PUSCH)) and control signals (Physical Uplink Control Channel (PUCCH)) are transmitted in units of subframes (see, NPL 1) FIG. 1 illustrates an example of a PUSCH subframe structure in the case of normal cyclic prefix. As illustrated in FIG. 1, one subframe consists of two time slots, and a plurality of SC-FDMA data symbols and pilot symbols (which is called Demodulation Reference Signal (DMRS)) are time-multiplexed in each slot. Upon receipt of a PUSCH, a base station performs channel estimation using DMRSs. The base station then demodulates and decodes the SC-FDMA data symbols using the result of channel estimation. Incidentally, Discrete-Fourier-Transform Spread Orthogonal Frequency Division Multiplexing (DFT-S-OFDM), which is an extended version of SC-FDMA, has become available in LTE-Advanced (LTE-A) Release 10 (Rel. 10). DFT-S-OFDM is a method that expands the scheduling flexibility by splitting the PUSCH formed as illustrated in FIG. 1 into two spectrums and mapping the respective spectrums to different frequencies.

DMRSs to be multiplexed with a PUSCH are generated on the basis of a Constant Amplitude Zero Auto-Correlation (CAZAC) sequence excellent in autocorrelation characteristics and cross-correlation characteristics. In LTE, 30 sequence groups each formed by grouping highly correlated CAZAC sequences having various sequence lengths (bandwidths) are defined (see, e.g., FIG. 2). Each cell is assigned one of the 30 sequence groups according to a cell specific ID (cell ID). As a result, the cells are respectively assigned sequence groups having low correlation between the cells.

A terminal generates a DMRS using a CAZAC sequence corresponding to the allocated bandwidth in the sequence group assigned to the cell serving the terminal and multiplexes the DMRS with a PUSCH. Accordingly, highly correlated DMRSs are transmitted from terminals in the same cell while low correlated DMRSs are transmitted from terminals in different cells. Even if interference between DMRSs transmitted at the same timing occurs, the interference can be reduced by the window function method or equalization because of the low intercell correlation of DMRSs. Meanwhile, the terminals within the same cell can be operated without interference by allocating different frequencies or time to the terminals for orthogonalization. In addition, the same frequency or time can be allocated to different terminals (which is called "Multi-user multi-input multi-output" (MU-MIMO)). In this technique, DMRSs of different terminals can be orthogonalized by configuring a different cyclic shift (CS) for each terminal or multiplying two DMRSs of terminals on a PUSCH by different orthogonal cover codes (OCC).

As described above, the reduction of intercell interference using different sequence groups achieves spatial recycling of radio resources. In addition, application of MI-MIMO enables using radio resources efficiently within a cell. In the manner described above, LTE enables highly efficient uplink transmission.

Furthermore, vertical cell IDs, which enable allocation of any sequence group to any terminal regardless of cell ID of the serving cell, are added in in LTE-A Release 11 (Rel. 11).

Incidentally, there has been an explosive increase in mobile traffic due to the widespread of smartphones in recent years. Thus, significant improvement in use efficiency of radio resources is required for providing users with stress-free mobile data communication services. In this respect, small cell enhancement, which involves deployment of a considerable number of small cell base stations each forming a small cell, has been studied in LTE-A Release 12 (Rel. 12) (see, NPL 4). Small cell enhancement is advantageous in that the radio resources allocatable by each cell per terminal can be increased by reducing the coverage to reduce the number of terminals per cell and that the data rate of terminals can be improved accordingly. Meanwhile, it is unrealistic to completely cover all areas by small cells. In addition, another problem is that the frequency of handover increases when a high-mobility terminal is connected to a small cell. For this reason, small cell deployment under the coverages of macro cells, each providing a larger coverage, in an overlaid manner has been considered (see, e.g., FIG. 3; sometimes called heterogeneous network (HetNet)). This small cell deployment enables providing large-volume communication to low-mobility terminals in need of a fast data communication service in small cells while eliminating coverage holes and supporting every terminal in macro cells.

Citation List
Non-Patent Literatures

| | |
|---|---|
| NPL 1 | 3GPP TS 36.211, "Evolved Universal Terrestrial Radio Access (E-UTRA); Physical channels and modulation," v.11.1.0 |
| NPL 2 | 3GPP TS 36.212, "Evolved Universal Terrestrial Radio Access (E-UTRA); Multiplexing and channel coding," v.11.1.0 |
| NPL 3 | 3GPP TS 36.213, "Evolved Universal Terrestrial Radio Access (E-UTRA); Physical layer procedures," v.11.1.0 |
| NPL 4 | 3GPP TR 36.932, "Scenarios and requirements for small cell enhancements for E-UTRA and E-UTRAN," v.12.0.0 |

BRIEF SUMMARY

Technical Problem

The network configuration that has been studied in small cell enhancement (see, e.g., FIG. 3) has the following characteristics.

(1) The channel condition and quality for terminals connected to a small cell are typically good. This is because the distance between a small cell base station and each terminal is likely to be short, so that communication is likely to be performed with higher received power or higher signal-to-noise ratio (SNR). In addition, the transmission power required for terminals is likely to be low for the same reasons.

(2) The number of simultaneously operated terminals in a small cell is smaller than in a macro cell because of the smaller coverage of small cell. A small cell may even communicate with only a terminal or two.

(3) Unlike macro cells, small cells are unlikely to be deployed evenly. Small cells may be deployed locally densely, while they may be deployed sparsely in a wide area.

According to the characteristics described above, it is expected that base stations can perform sufficiently accurate channel estimation since channel states and quality are good in the uplink of terminals communicating with small cells in small cell enhancement. Meanwhile, since the number of simultaneously operated terminals in each small cell is small, an advantage of application of MIMO is reduced. For this reason, it is not always necessary to use 14% or more of a PUSCH subframe (⅐ of the total) for DMRSs as illustrated in FIG. 1. Specifically, higher terminal throughput can be achieved if DMRSs in a PUSCH subframe are reduced, and radio resources thus obtained by DMRS reduction are used for data (PUSCH) for uplink communication of terminals with a small cell.

Because of the background described above, application of a technique that improves the data rate per terminal and per subframe through replacement of part of DMRSs on a PUSCH with data (the technique is referred to as "Reduced DMRS" in the following description) has been studied in small cell enhancement. For example, if the DMRSs included in a PUSCH subframe illustrated in FIG. 1 are reduced to half, the data rate can be improved by approximately 7%, and if the DMRSs are reduced to ¼, the data rate can be improved by as much as 11%.

FIG. 4A illustrates mapping pattern indicating DMRS (Legacy DMRS) mapping in a single subframe (legacy DMRS pattern) in Rel. 11 or before. FIGS. 4B to 4E illustrate exemplary mapping patterns each indicating DMRS mapping in a single subframe in Reduced DMRS (Reduced DMRS patterns (1) to (4)). As illustrated in FIGS. 4B to 4E, the proportion of a DMRS in each reduced DMRS pattern is less than in the legacy DMRS pattern. Stated differently, the resources to which a DMRS is mapped are in the Reduced DMRS pattern is less than in the legacy DMRS pattern.

The legacy DMRS pattern (see FIG. 4A) corresponds to a subframe structure illustrated in FIG. 1 and is a pattern in which two DMRSs are mapped in a single subframe.

Reduced DMRS patterns (1) and (2) (see, FIGS. 4B and 4C) are each a pattern in which one of two DMRSs included in the legacy DMRS pattern (see, FIG. 4A) is replaced with data. As a result, application of orthogonal cover codes (OCCs) becomes difficult, but the data rate can be improved by increasing the amount of resource allocation to data. In addition, when PUSCH subframes of reduced DMRS patterns (1) and (2) are connected together temporally and transmitted contiguously, two DMRSs can be used over two subframes, so that multiplexing by means of orthogonal cover codes is possible (see, e.g., FIG. 5A). Likewise, when the PUSCH subframes of reduced DMRS patterns (2) and (1) are connected together temporally and transmitted contiguously, two DMRSs can be used over two subframes, so that multiplexing by means of orthogonal cover codes is possible (see, e.g., FIG. 5B). Moreover, since the temporal distance between DMRSs multiplied by orthogonal cover codes is small in FIG. 5B as compared with FIG. 5A, it is possible to apply MU-MIMO to a high-mobility terminal.

Reduced DMRS pattern (3) (see, FIG. 4D) is a method of mapping DMRSs each having a sequence length shorter than the allocated bandwidth in a distributed manner in each SC-FDMA symbol. As in reduced DMRS patterns (1) and (2), the data rate can be improved by allocating the resource elements (RE) to which no DMRS is mapped to data. Moreover, orthogonal multiplexing of DMRSs between different terminals by means of orthogonal cover codes is possible as in the case of Rel. 11 (FIG. 4A) because the configuration in which DMRSs are respectively mapped to two different SC-FDMA symbols within a single subframe is maintained in reduced DMRS pattern (3). Accordingly, reduced DMRS pattern (3) is advantageous in that application of MU-MIMO is easier. Meanwhile, reduced DMRS pattern (3) has a concern that PAPR of the terminal increases, considering that a DMRS and data are frequency multiplexed in the same SC-FDMA symbol. However, since the transmission power of a terminal connected to a small cell is likely to be low, an increase in PAPR of the terminal does not a matter. In addition, the resource element to which a DMRS is mapped in one of the two SC-FDMA symbols may be shifted from the resource element to which a DMRS is mapped in the other one of the two SC-FDMA symbols (not illustrated). In this case, the channel estimation accuracy can be improved by averaging or interpolating the channel estimation values by the DMRSs included in the two SC-FDMA symbols.

Reduced DMRS pattern (4) (see, FIG. 4E) is a method of locally mapping a DMRS having a sequence length shorter than the allocated bandwidth in each SC-FDMA symbol. Reduced DMRS pattern (4) is advantageous, as compared to reduced DMRS pattern (3), in that channel fluctuations in the frequency direction in the band to which the DMRS is mapped can be easily estimated, and that the effects obtained in reduced DMRS pattern (3) can be also obtained. It should be noted that, the frequency positions at which DMRSs are mapped, and the relative frequency positions of the DMRSs between two SC-FDMA symbols are not limited to the example illustrated in FIG. 4E.

Some examples of Reduced DMRS have been described above.

However, it is not true that Reduced DMRS is always effective. For example, Reduced DMRS is effective when the channel quality of a terminal is good, but when the channel quality is poor, it is preferable to increase the channel estimation accuracy by increasing the DMRS energy using Legacy DMRS. In addition, when large interference from a terminal to a neighboring cell is expected, the use of Legacy DMRS requires keeping the correlation of interference to the DMRSs of terminals connected to a neighboring cell low. Moreover, it is necessary to use Legacy DMRS for terminals supporting the features of Rel. 12 when MU-MIMO is applied to terminals supporting the features of Rel. 12 and legacy terminals because terminals supporting only the features of Rel. 8 to 11 (legacy terminals) are capable of using only Legacy DMRS.

It is preferable that switching between Legacy DMRS and Reduced DMRS be flexibly controllable according to the judgment of a base station in consideration of ensuring uplink scheduling flexibility. As described above (see, FIGS. 4B to 4E), providing a plurality of mapping patterns as Reduced DMRS is possible. Accordingly, a DMRS pattern suitable for a terminal needs to be selectable from among a plurality of DMRS patterns including a legacy DMRS pattern and a plurality of Reduced DMRS patterns in accordance with the channel quality of terminal, the conditions around the terminal, or the data required by the terminal.

It is an object of the present disclosure to provide a terminal, a base station, a method of generating a DMRS, and a transmission method each of which allows a DMRS pattern suitable for a terminal to be selected from among a plurality of DMRS patterns including Legacy DMRS and Reduced DMRS.

Solution to Problem

A terminal according to an aspect of the present disclosure includes: a reception section that receives uplink control information; a control section that determines a specific mapping pattern based on the control information from among a plurality of mapping patterns for an uplink demodulation reference signal (DMRS); and a generation section that generates a DMRS according to the specific mapping pattern.

A base station according to an aspect of the present disclosure includes: a control signal generating section that generates uplink control information based on a mapping pattern to be indicated to a terminal from among a plurality of mapping patterns for an uplink demodulation reference signal (DMRS); and a transmission section that transmits the generated control information.

A method of generating a demodulation reference signal (DMRS) according to an aspect of the present disclosure includes: receiving uplink control information; determining a specific mapping pattern based on the control information from among a plurality of mapping patterns for an uplink DMRS; and generating a DMRS according to the specific mapping pattern.

A transmission method according to an aspect of the present disclosure includes: generating uplink control information based on a mapping pattern to be indicated to a terminal from among a plurality of mapping patterns for an uplink demodulation reference signal (DMRS); and transmitting the generated control information.

Advantageous Effects of Disclosure

According to the present disclosure, a DMRS pattern suitable for a terminal can be selected from among a plurality of DMRS patterns including Legacy DMRS and Reduced DMRS.

BRIEF DESCRIPTION OF THE SEVERAL VIEWS OF THE DRAWINGS

FIGS. 4A, 4B, 4C, 4D, and 4E are diagrams illustrating examples of a legacy DMRS pattern and reduced DMRS patterns;

FIG. 11 is a diagram illustrating a correspondence between DPIs and DMRS patterns according to Embodiment 1 of the present disclosure;

FIG. 12 is a diagram illustrating a correspondence between DPIs, DMRS patterns, and virtual cell IDs according to Embodiment 1 of the present disclosure;

FIG. 13 is a diagram illustrating a correspondence between DPIs, DMRS patterns, and base sequence group hopping according to Embodiment 1 of the present disclosure;

FIG. 19 is a diagram illustrating a correspondence between allocation bandwidths and DMRS patterns according to Embodiment 2 of the present disclosure;

FIG. 21 is a diagram illustrating a correspondence between the start positions of allocation bandwidths and DMRS patterns according to Embodiment 2 of the present disclosure;

FIGS. 23A and 23B are diagrams each illustrating a correspondence between A-SRS trigger bits and DMRS patterns according to Embodiment 3 of the present disclosure;

FIG. 24 is a diagram illustrating a correspondence between control channels and DMRS patterns according to Embodiment 4 of the present disclosure;

FIG. 25 is a diagram illustrating a correspondence between CS fields and DMRS patterns according to Embodiment 5 of the present disclosure;

FIG. 26 is another diagram illustrating a correspondence between CS fields and DMRS patterns according to Embodiment 5 of the present disclosure;

DETAILED DESCRIPTION

Figure 1:
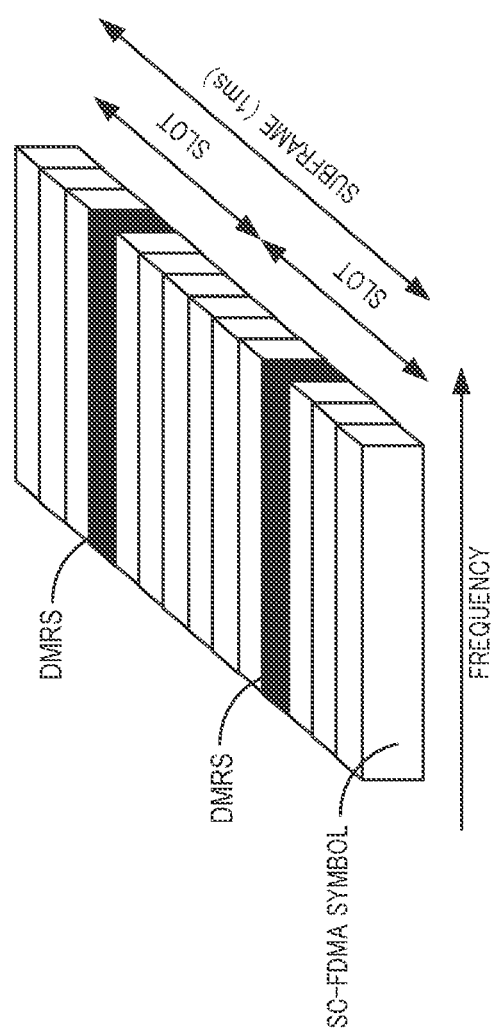
FIG. 1 is a diagram illustrating an uplink subframe structure.
Figure 2:
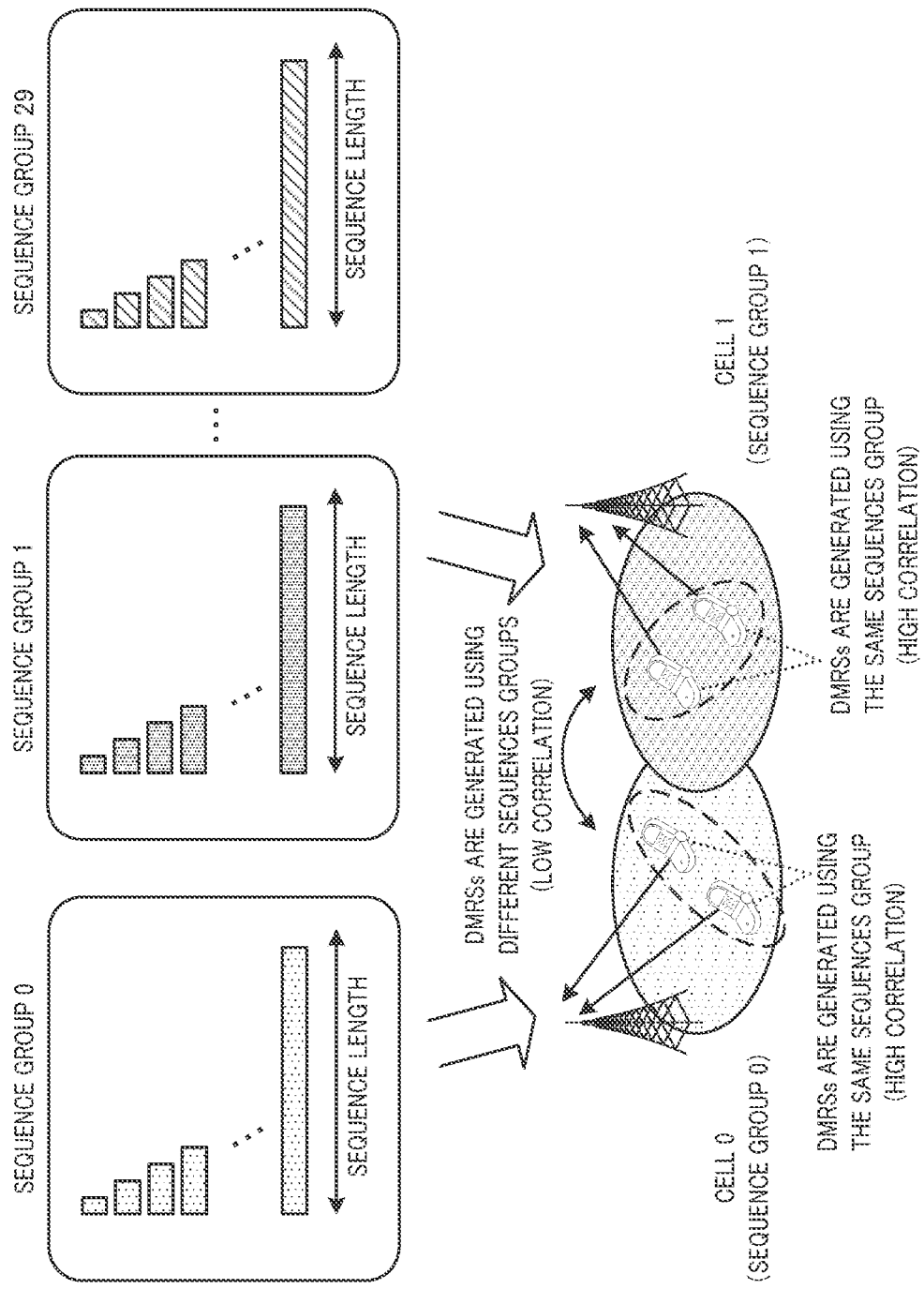
FIG. 2 is a block diagram illustrating how sequence groups are assigned for DMRSs.
Figure 3:
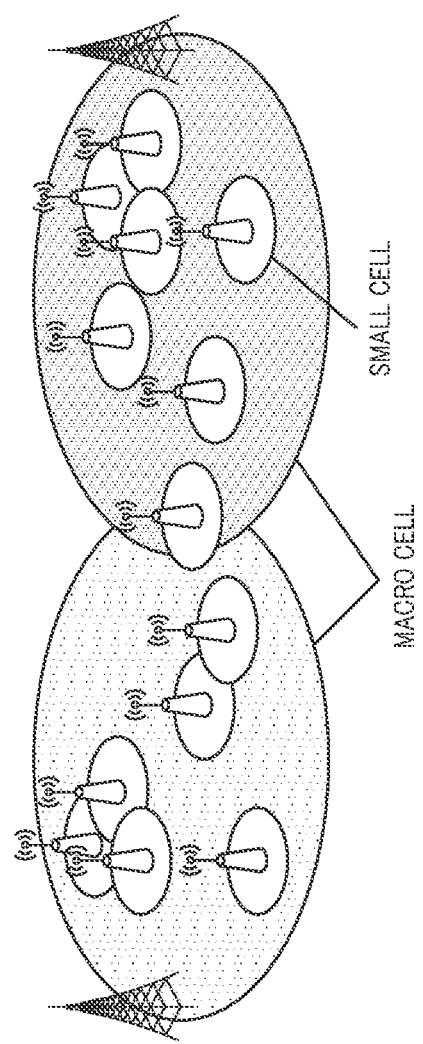
FIG. 3 is a diagram illustrating a network configuration in small cell enhancement.
Figure 5A:
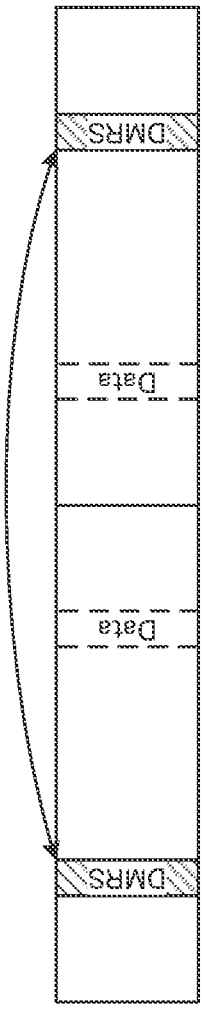
FIGS. 5A and 5B are diagrams each illustrating orthogonal multiplexing using a Reduced DMRS pattern by means of OCCs.
Figure 5B:
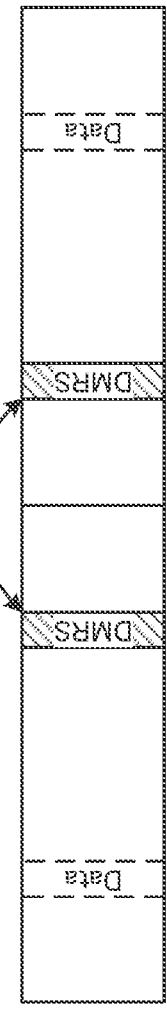

Hereinafter, embodiments of the present disclosure will be described in detail with reference to the drawings.

Throughout the embodiments, the same elements are assigned the same reference numerals and any duplicate description of the elements is omitted.

Embodiment 1

(Summary of Communication System)

Figure 6:
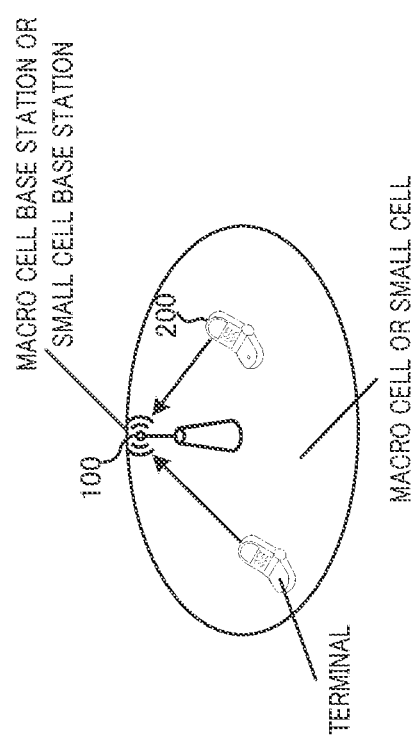
FIG. 6 is a diagram illustrating a communication system according to Embodiment 1 of the present disclosure.

FIG. 6 illustrates a communication system according to Embodiment 1. The communication system illustrated in FIG. 6 includes base station 100 and one or more terminals 200 within a cell. Referring to FIG. 6, base station 100 may be a macro cell base station or a small cell base station. In addition, the communication system may be a HetNet system, which includes a macro cell base station and small cell base stations, or may be a coordinated multipoint (CoMP) system in which a plurality of base stations cooperatively communicates with a terminal. Macro cells and small cells may be operated using different frequencies or the same frequency.

(Configuration of Base Station 100)

Figure 7:
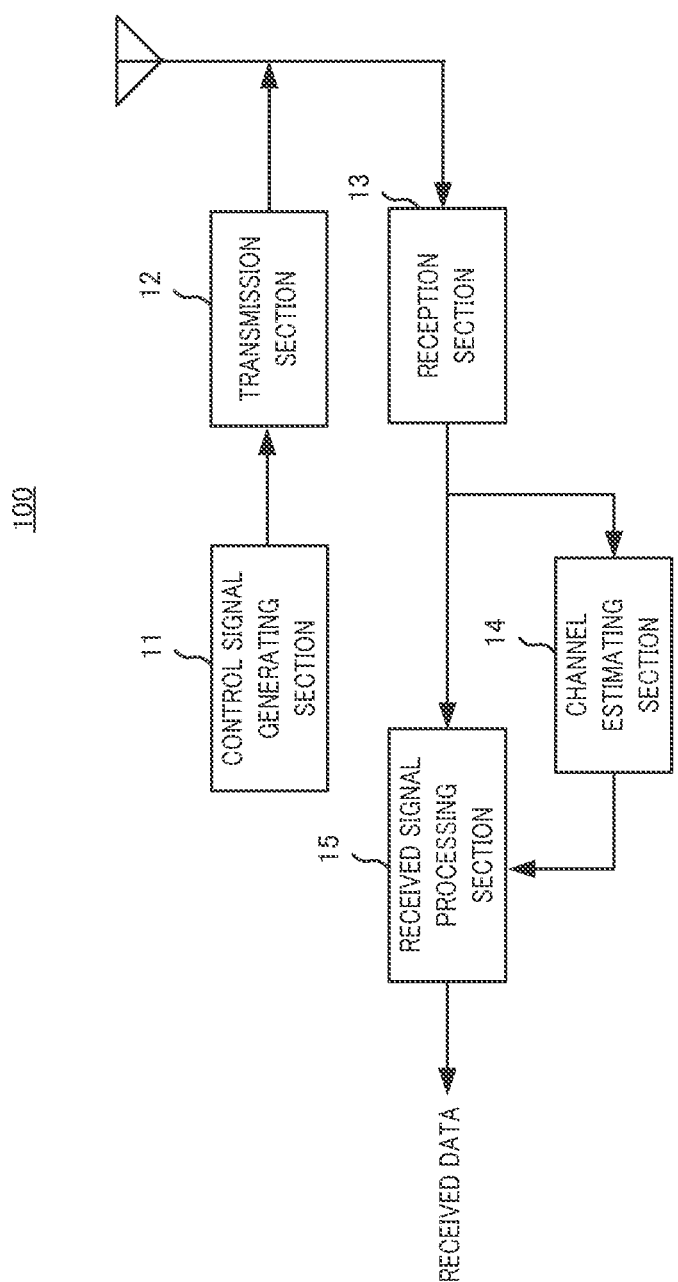
FIG. 7 is a block diagram illustrating a primary configuration of a base station according to Embodiment 1 of the present disclosure.

FIG. 7 is a block diagram illustrating primary parts of base station 100.

Base station 100 illustrated in FIG. 7 includes control signal generating section 11, transmission section 12, reception section 13, channel estimating section 14, and received signal processing section 15.

Control signal generating section 11 generates a control signal intended for terminal 200 and transmission section 12 transmits the generated control signal via an antenna. The control signal includes a UL grant indicating PUSCH assignment. A UL grant consists of a plurality of bits and includes information indicating a frequency allocation resource (resource block (RB)), a modulation and coding scheme, sounding reference signal (SRS) trigger and/or the like. In addition, a UL grant includes a DMRS pattern indicator (DPI) for specifying a DMRS mapping pattern (DMRS pattern) in transmission of the assigned PUSCH. A DPI consists of one or more bits. It is assumed that candidate DMRS patterns selectable by DPI are previously indicated to terminal 200 via higher layers or predetermined. In addition, a control signal is transmitted using a downlink control channel (physical downlink control channel (PDCCH)) or (enhanced physical downlink control channel (EPDCCH)). An EPDCCH may be called an EPDCCH set and configured to be mapped within a PDSCH as a new control channel different from a PDCCH.

Specifically, control signal generating section 11 generates an uplink control information on the basis of a mapping pattern to be indicated to terminal 200 from among a plurality of uplink DMRS mapping patterns. Transmission section 12 transmits the generated control information.

Reception section 13 receives, via an antenna, a PUSCH transmitted from terminal 200 according to an UL grant and extracts data and a DMRS. Channel estimating section 14 performs channel estimation using the DMRS. Received signal processing section 15 demodulates and decodes the data on the basis of the estimated channel estimate.

Figure 8:
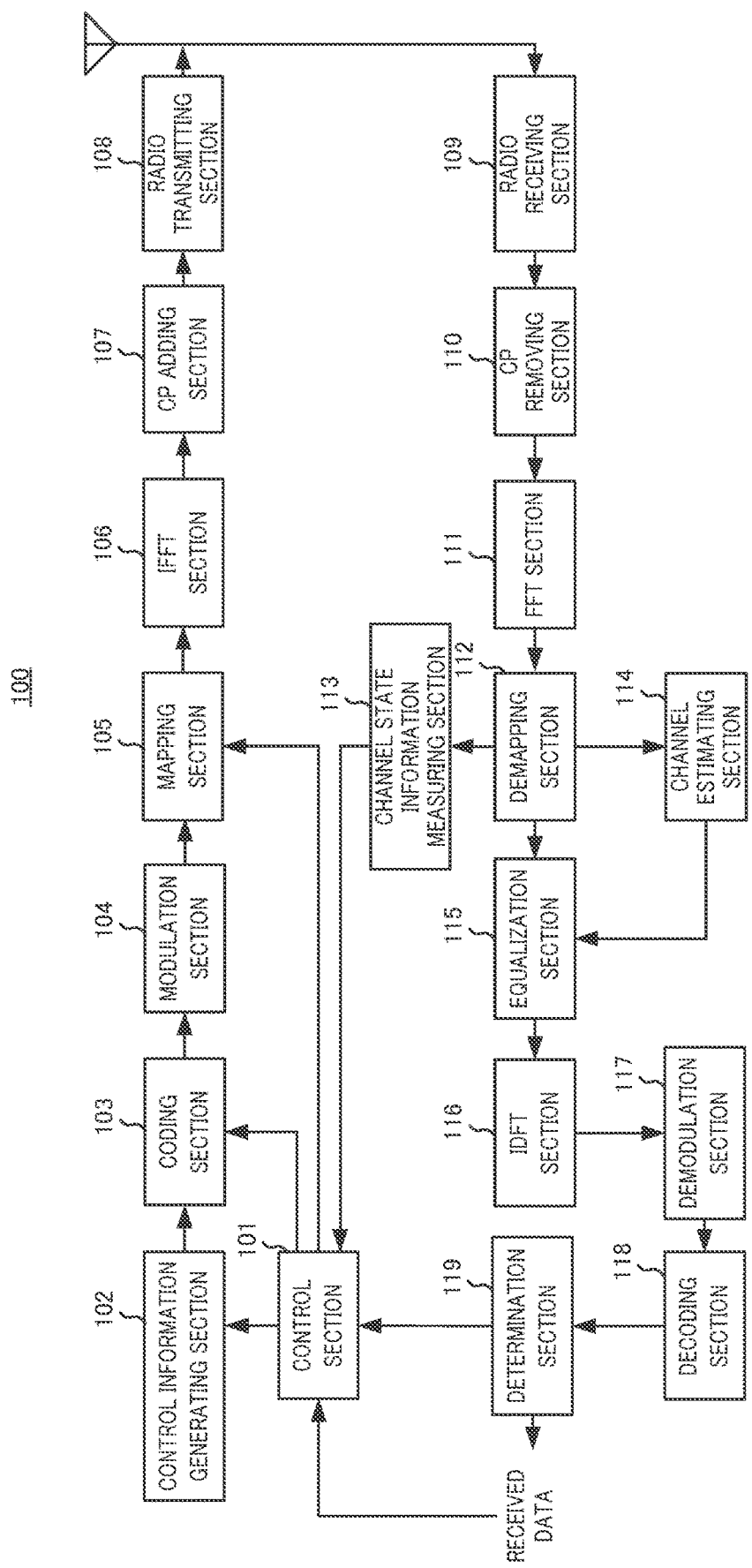
FIG. 8 is a block diagram illustrating a configuration of the base station according to Embodiment 1 of the present disclosure.

FIG. 8 is a block diagram illustrating base station 100 in detail.

Base station 100 as illustrated in FIG. 8 includes control section 101, control information generating section 102, coding section 103, modulation section 104, mapping section 105, inverse fast Fourier transform (IFFT) section 106, cyclic prefix (CP) adding section 107, radio transmitting section 108, radio receiving section 109, CP removing section 110, fast Fourier transform (FFT) section 111, demapping section 112, channel state information measuring section 113, channel estimating section 114, equalization section 115, inverse discrete Fourier transform (IDFT) section 116, demodulation section 117, decoding section 118, and determination section 119.

Of the components mentioned above, control section 101, control information generating section 102, coding section 103, and modulation section 104 mainly serve as control signal generating section 11 (see, FIG. 7), and mapping section 105, IFFT section 106, CP adding section 107, and radio transmitting section 108 serve as transmission section 12 (see, FIG. 7). In addition, radio receiving section 109, CP removing section 110, FFT section 111, and demapping section 112 mainly serve as reception section 13 (see, FIG. 7), and channel estimating section 114 serves as channel estimating section 14, while equalization section 115, IDFT section 116, demodulation section 117, decoding section 118, and determination section 119 mainly serve as received signal processing section 15 (see, FIG. 7).

In base station 100 illustrated in FIG. 8, control section 101 determines PUSCH subframe allocation for terminal 200 in accordance with the conditions of terminal 200 or reception conditions thereof. Control section 101 determines the PUSCH subframe allocation for terminal 200 on the basis of a determination result of received data of terminal 200 received as input from determination section 119 (the presence or absence of an error (ACK or NACK)) and channel state information (CSI) or the like of terminal 200 received as input from CSI measuring section 113, for example. Control section 101 determines frequency resource block (RB) allocation information, a coding scheme, a modulation scheme, information indicating initial transmission or retransmission, a hybrid automatic repeat request (HARQ) process number, DMRS pattern information (DPI) and/or the like to be indicated to terminal 200, and transmits the determined information to control information generating section 102.

Control section 101 determines a coding level for the control signal intended for terminal 200 and outputs the determined coding level to coding section 103. The coding level is determined in accordance with the amount of control information included in the control signal to be transmitted or the conditions of terminal 200.

In addition, control section 101 determines a radio resource element (RE) to which the control signal intended for terminal 200 is mapped, and indicates the determined RE to mapping section 105.

Control information generating section 102 generates a control information bit sequence using the control information intended for terminal 200, which is received as input from control section 101, and outputs the generated control information bit sequence to coding section 103. Incidentally, control information may be transmitted to a plurality of terminals 200. For this reason, control information generating section 102 generates the bit sequence while including the terminal IDs of respective terminals 200 in the control information intended for terminals 200. For example, CRC bits masked by the terminal IDs of destination terminals 200 are added to the control information.

Coding section 103 encodes the control information bit sequence received as input from control information generating section 102, using the coding level indicated by control section 101. Coding section 103 outputs the coded bit sequence to modulation section 104.

Modulation section 104 modulates the coded bit sequence received as input from coding section 103 and outputs the symbol sequence obtained by modulation to mapping section 105.

Mapping section 105 maps the control signal received as the symbol sequence from modulation section 104 to the radio resource indicated by control section 101. The control channel to be the mapping target may be a PDCCH or EPDCCH. Mapping section 105 inputs a signal in a downlink subframe including the PDCCH or EPDCCH to which the control signal is mapped to IFFT section 106.

IFFT section 106 performs an IFFT for the downlink subframe received from mapping section 105 to transform the frequency-domain signal sequence into a time waveform. IFFT section 106 outputs the time waveform obtained by transformation to CP adding section 107.

CP adding section 107 adds a CP to the time waveform received as input from IFFT section 106 and outputs the CP-added signal to radio transmitting section 108.

Radio transmitting section 108 performs transmission processing such as D/A conversion and up-conversion on the signal received as input from CP adding section 107 and transmits the signal resulting from the transmission processing to terminal 200 via an antenna.

Radio receiving section 109 receives, via an antenna, the uplink signal (PUSCH) transmitted from terminal 200, then performs reception processing such as down-conversion and A/D conversion on the received signal and outputs the signal resulting from the reception processing to CP removing section 110.

CP removing section 110 removes a waveform corresponding to the CP from the signal (time waveform) received as input from radio receiving section 109 and outputs the signal after CP removal to FFT section 111.

FFT section 111 performs an FFT on the signal (time waveform) received as input from CP removing section 110 to decompose the signal into a frequency-domain signal sequence (frequency components in units of subcarriers) and extracts a signal corresponding to the PUSCH subframe. FFT section 111 outputs the obtained signal to demapping section 112.

Demapping section 112 extracts a PUSCH subframe portion allocated to terminal 200 from the received signal. Demapping section 112 decomposes the PUSCH subframe extracted from terminal 200 into a DMRS and data symbols (SC-FDMA data symbols) and outputs the DMRS to channel estimating section 114 and the data symbols to equalization section 115. When terminal 200 transmits a sounding reference signal (SRS) in the PUSCH subframe, demapping section 112 extracts the SRS and outputs the extracted SRS to CSI measuring section 113. When an SRS is transmitted, the last data symbol of the PUSCH subframe is replaced with the SRS. Thus, demapping section 112 may separate the SRS and data symbols in this case.

Upon receipt of an SRS from demapping section 112, CSI measuring section 113 performs CSI measurement using the SRS. CSI measuring section 113 then outputs the result of CSI measurement to control section 101.

Channel estimating section 114 performs channel estimation using the DMRS received as input from demapping section 112. Channel estimating section 114 outputs the obtained channel estimate to equalization section 115.

Equalization section 115 performs equalization of the SC-FDMA data symbols received as input from demapping section 112, using the channel estimate received as input from channel estimating section 114. Equalization section 115 outputs the equalized SC-FDMA data symbols to IDFT section 116.

IDFT section 116 performs an IDFT of a bandwidth in accordance with the allocation bandwidth on the SC-FDMA data symbols in the frequency-domain to transform the SC-FDMA data symbols into a time-domain signal. IDFT section 116 outputs the obtained time-domain signal to demodulation section 117.

Demodulation section 117 performs data demodulation on the time-domain signal received as input from IDFT section 116. Specifically, demodulation section 117 converts the symbol sequence into a bit sequence on the basis of the modulation scheme indicated to terminal 200 and outputs the obtained bit sequence to decoding section 118.

Decoding section 118 performs error correction coding on the bit sequence received as input from demodulation section 117 and outputs the decoded bit sequence to determination section 119.

Determination section 119 performs error detection on the bit sequence received as input from decoding section 118. The error detection is performed using the CRC bits added to the bit sequence. Determination section 119 extracts the received data when the determination on CRC bits results in no error, and indicates ACK to control section 101. Meanwhile, determination section 119 indicates NACK to control section 101 when the determination on CRC bits results in an error.

(Configuration of Terminal)

Figure 9:
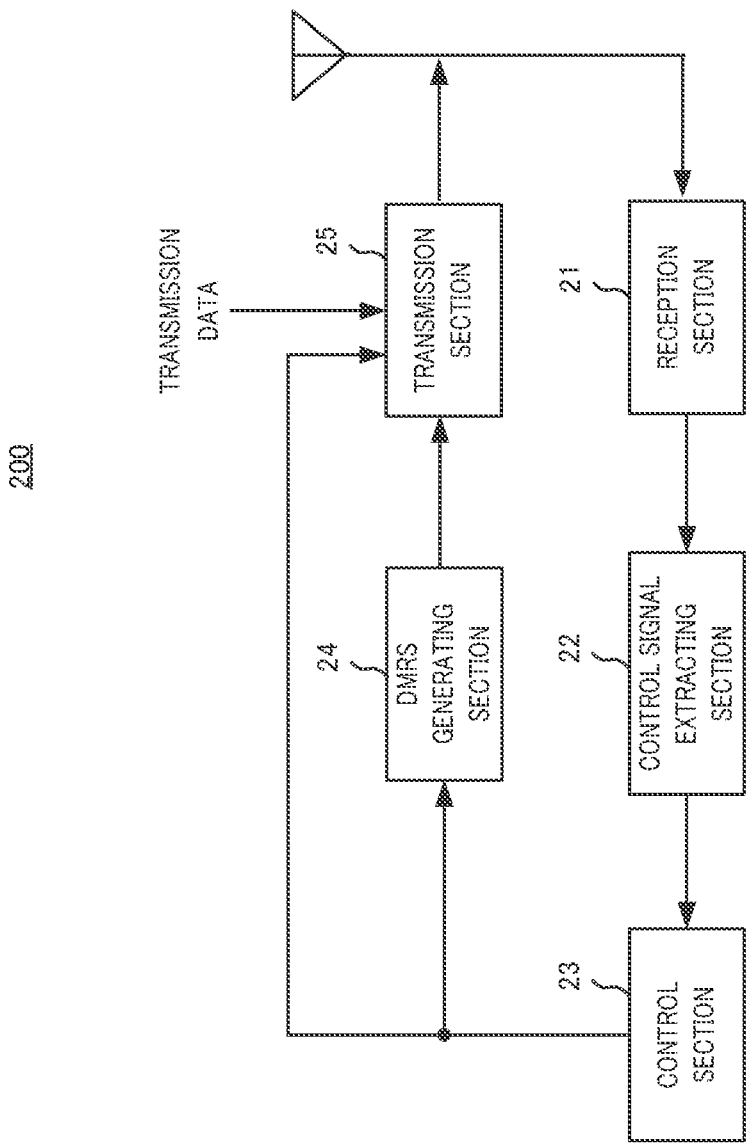
FIG. 9 is a block diagram illustrating a primary configuration of a terminal according to Embodiment 1 of the present disclosure.

FIG. 9 is a block diagram illustrating a primary configuration of a terminal.

Terminal 200 illustrated in FIG. 9 includes reception section 21, control signal extracting section 22, control section 23, DMRS generating section 24, and transmission section 25.

Reception section 21 receives a control signal (UL grant) transmitted to terminal 200 on a PDCCH or EPDCCH and control signal extracting section 22 extracts information about allocation of a PUSCH subframe from the control signal. Specifically, control signal extracting section 22 blind-decodes allocation candidates of the control signal on a predetermined control channel, and when succeeding in decoding a control signal to which CRC bits masked by the terminal ID of terminal 200 are added, control signal extracting section 22 extracts the control signal as control information intended for terminal 200. The control information includes frequency resource block (RB) allocation information, a modulation scheme, information indicating initial transmission or retransmission, a HARQ process number, A-SRS trigger (aperiodic SRS transmission request), DMRS pattern information (DPI) and/or the like.

Control section 23 determines a PUSCH subframe structure on the basis of the extracted control information (UL grant). Control section 23 determines the DMRS pattern to be used according to the value of DPI included in the UL grant, for example. DMRS generating section 24 generates a DMRS according to the indication from control section 23. Transmission section 25 transmits a PUSCH subframe signal including the DMRS according to the indication from control section 23.

More specifically, reception section 21 receives uplink control information, and control section 23 determines a specific mapping pattern from among a plurality of mapping patterns for uplink DMRSs on the basis of the control information. DMRS generating section 24 generates a DMRS according to the specific mapping pattern.

Figure 10:
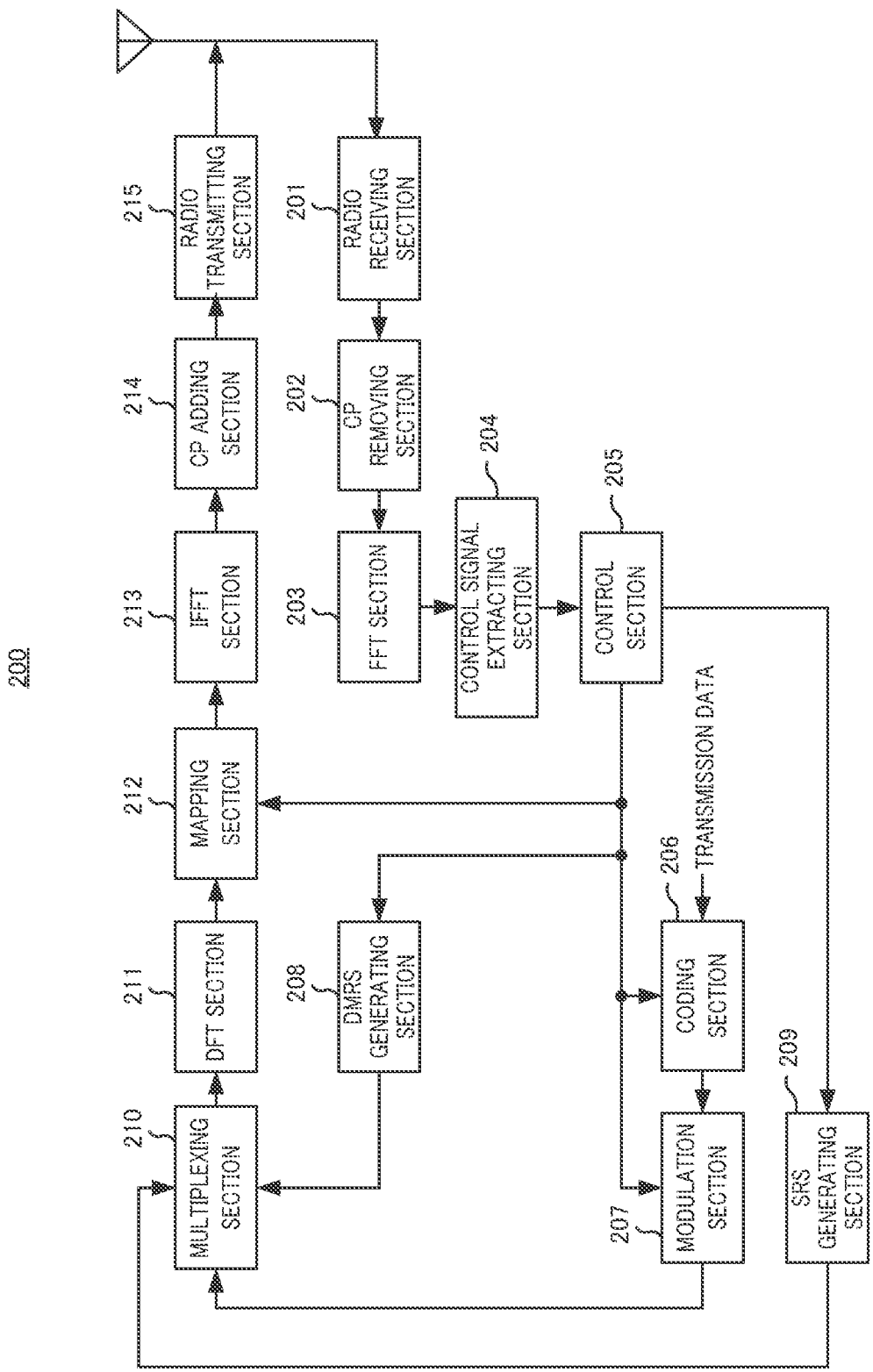
FIG. 10 is a block diagram illustrating a configuration of the terminal according to Embodiment 1 of the present disclosure.

FIG. 10 is a block diagram illustrating terminal 200 in detail.

Terminal 200 illustrated in FIG. 10 includes radio receiving section 201, CP removing section 202, FFT section 203, control signal extracting section 204, control section 205, coding section 206, modulation section 207, DMRS generating section 208, SRS generating section 209, multiplexing section 210, discrete Fourier transform (DFT) section 211, mapping section 212, IFFT section 213, CP adding section 214, and radio transmitting section 215.

Of the components mentioned above, radio receiving section 201, CP removing section 202, and FFT section 203 mainly serve as reception section 21 (see, FIG. 9). In addition, coding section 206, modulation section 207, SRS generating section 209, multiplexing section 210, DFT section 211, mapping section 212, IFFT section 213, CP adding section 214, and radio transmitting section 215 mainly serve as transmission section 25 (see, FIG. 9). Moreover, control signal extracting section 204 serves as control signal extracting section 22, and control section 205 serves as control section 23. DMRS generating section 208 serves as DMRS generating section 24.

In terminal 200 illustrated in FIG. 10, radio receiving section 201 receives, via an antenna, a control signal (PDCCH or EPDCCH) transmitted from base station 100 (see, FIG. 8), then perform reception processing such as down-conversion and A/D conversion on the control signal and outputs the control signal subjected to the reception processing to CP removing section 202.

CP removing section 202 removes a CP from a downlink subframe signal including a PDCCH or EPDCCH from the control signal received as input from radio receiving section 201 and outputs the signal after CP removal to FFT section 203.

FFT section 203 performs an FFT on the signal (downlink subframe) received as input from CP removing section 202, to transform the signal into a frequency-domain signal. FFT section 203 outputs the frequency-domain signal to control signal extracting section 204.

Control signal extracting section 204 performs blind-decoding on the frequency-domain signal received as input from FFT section 203 to attempt decoding of the control signal. The control signal intended for terminal 200 includes a CRC masked by the terminal ID of terminal 200 and added to the control signal. Accordingly, when a CRC judgment on the result of blind-decoding in OK, control signal extracting section 204 extracts and outputs the control signal to control section 205.

Control section 205 controls PUSCH transmission on the basis of the control signal received as input from control signal extracting section 204.

Specifically, control section 205 indicates RB allocation for PUSCH transmission to mapping section 212 on the basis of the PUSCH RB allocation information included in the control signal. Moreover, control section 205 indicates a coding method and a modulation scheme for PUSCH transmission to coding section 206 and modulation section 207 on the basis of the information on the coding method and modulation scheme, respectively. Control section 205 also indicates, on the basis of an SRS trigger included in the control information, whether or not to transmit an SRS after a certain period of time passes. The SRS indicated by the SRS trigger may be transmitted while being multiplexed in the PUSCH subframe indicated by the UL grant, or may be transmitted in a subframe transmitted after the PUSCH subframe. In addition, control section 205 determines the DMRS pattern for PUSCH transmission on the basis of the DPI included in the control signal and indicates the determined DMRS pattern to DMRS generating section 208.

Coding section 206 performs error correction coding by adding CRC bits masked by the terminal ID to the transmission data received as input. The coding rate, codeword length and/or the like for coding section 206 to perform the error correction coding are indicated by control section 205. Coding section 206 outputs a coded bit sequence to modulation section 207.

Modulation section 207 modulates the bit sequence received as input from coding section 206. The modulation level (i.e., m-ary modulation number) and the like for modulation section 207 to perform the modulation are indicated by control section 205. Modulation section 207 outputs the modulated data symbol sequence to multiplexing section 210.

DMRS generating section 208 generates a DMRS according to the DMRS pattern indicated by control section 205 and outputs the DMRS to multiplexing section 210.

SRS generating section 209 generates an SRS according to an indication from control section 205 and outputs the SRS to multiplexing section 210. It should be noted herein that, the transmission timing of SRS is not necessarily the same as that of the PUSCH subframe indicated by the UL grant.

Multiplexing section 210 multiplexes the data symbol sequence, DMRS, and SRS respectively received as input from modulation section 207, DMRS generating section 208, and SRS generating section 209, then multiplexes the data symbol sequence, DMRS, and SRS, and outputs the multiplexed signal to DFT section 211.

DFT section 211 performs a DFT on the signal received as input from multiplexing section 210, then decomposes the signal into frequency component signals in units of subcarriers, and outputs the obtained frequency component signals to mapping section 212.

Mapping section 212 maps the signals received as input from DFT section 211 (i.e., data symbol sequence, DMRS, and SRS), according to the indication from control section 205 to time and frequency resources allocated in the PUSCH subframe. Mapping section 212 outputs the PUSCH subframe signal to IFFT section 213.

IFFT section 213 performs an IFFT on the PUSCH subframe signal in the frequency-domain, which is received as input from mapping section 212, to transform the frequency-domain signal into a time-domain signal. IFFT section 213 outputs the time-domain signal obtained by the transformation to CP adding section 214.

CP adding section 214 adds a CP to the time-domain signal received as input from IFFT section 213 (every output from IFFT section 213) and outputs the CP-added signal to radio transmitting section 215.

Radio transmitting section 215 performs transmission processing such as D/A conversion and up-conversion on the signal received as input from CP adding section 214 and transmits the signal subjected to the transmission processing to base station 100 via an antenna.

(Operation)

A processing flow of base station 100 and terminal 200 according to Embodiment 1 will be described using steps (1) to (4).

Step (1): Prior to transmission and reception of a PUSCH, base station 100 indicates to terminal 200 that a plurality of DMRS patterns may be specified. DMRS patterns that may be specified can be predetermined or indicated to terminal 200 by base station 100 from a plurality of candidates via higher layers. The DMRS patterns that may be specified includes reduced DMRS patterns as illustrated in FIGS. 4B to 4E and FIGS. 5A and 5B in addition to the legacy DMRS pattern (see, e.g., FIG. 4A) used in Rel. 8 to 10, for example.

In step (1), the indication to terminal 200 may be made by base station 100 that performs the transmission and reception of PUSCH, or may be made by base station 100 other than base station 100 that performs the transmission and reception of PUSCH. For example, base station 100 that performs the transmission and reception of PUSCH may be a small cell base station and a base station that makes the indication may be a macro cell base station in step (1).

Step (2): Base station 100 transmits a control signal (UL grant) to terminal 200 via a PDCCH or EPDCCH to indicate PUSCH assignment. The UL grant includes a DMRS pattern indicator (DPI) indicating a DMRS pattern. The DPI indicates one specific DMRS pattern from a plurality of candidate DMRS patterns to terminal 200. Specifically, base station 100 (control section 101) generates the DPI on the basis of the specific DMRS pattern to be indicated to terminal 200.

FIG. 11 illustrates an example when a DPI consists of two bits. In FIG. 11, the legacy DMRS pattern and reduced DMRS patterns (1) to (3) are associated respectively with the values of DPI.

It should be noted herein that, the UL grant including a DPI may be transmitted to terminal 200 from base station 100 that performs the transmission and reception of PUSCH or from base station 100 other than the base station that performs the transmission and reception of PUSCH. For example, base station 100 that performs the transmission and reception of PUSCH may be a small cell base station, and the base station that performs the transmission of UL grant may be a macro cell base station.

Step (3): Terminal 200 blind-decodes a PDCCH or EPDCCH received in step (2) and acquires the control signal (UL grant) intended for the terminal. When the UL grant includes a DPI, terminal 200 (control section 205) determines a specific DMRS pattern to be used by terminal 200 from a plurality of candidate DMRS patterns on the basis of the DPI. Terminal 200 (DMRS generating section 208) generates a DMRS used for the PUSCH transmission according to the specific DMRS pattern.

Step (4): Base station 100 receives the PUSCH transmitted from terminal 200 in step (3) and performs channel estimation on the basis of the DMRS extracted from the PUSCH subframe. Base station 100 performs equalization, demodulation, and decoding of the data symbols using the obtained channel estimate.

When determining that the data is correctly decoded, base station 100 transmits ACK to terminal 200 to prompt the next data transmission. When determining that the decoding result of data includes an error, base station 100 transmits NACK to terminal 200 to prompt HARQ retransmission.

(Advantageous Effects)

As described above, base station 100 indicates any one of the predetermined plurality of DMRS patterns to terminal 200, using the DPI included in the UL grant on the downlink control channel (PDCCH or EPDCCH). Terminal 200 identifies the DMRS pattern in the PUSCH subframe according to the DPI included in the UL grant transmitted from base station 100.

According to the processing flow, base station 100 can dynamically switch between DMRS patterns for terminal 200. According to Embodiment 1, a DMRS pattern suitable for terminal 200 can be selected from among a plurality of DMRS patterns including a legacy DMRS pattern and reduced DMRS patterns.

Base station 100 can dynamically switch between a DMRS pattern that allows reception with high channel estimation accuracy (legacy DMRS pattern) and a DMRS pattern involving low overhead (reduced DMRS pattern) in accordance with the conditions or environment of terminal 200, for example. Thus, according to Embodiment 1, higher reliability and an increase in communication volume can be flexibly achieved.

In addition, when a legacy terminal (e.g., terminal supporting the features of Rel. 10) exists in the cell, for example, base station 100 may perform spatial multiplexing for the legacy terminal and terminal 200 by means of CS and OCCs by instructing terminal 200 to use Legacy DMRS. Moreover, base station 100 may cause terminal 200 to transmit data using a low overhead PUSCH subframe by indicating terminal 200 to use a reduced DMRS pattern. In this manner, base station 100 can flexibly indicate uplink scheduling for terminal 200. Thus, according to Embodiment 1, characteristic degradation due to the scheduling restrictions can be avoided.

Particularly, since the number of terminals performing communication simultaneously is small in a small cell, it is expected that there is not much traffic on the downlink control channel. Moreover, the distance between a small cell base station and each terminal is relatively short in a small cell, so that a possible decrease in the coverage associated with addition of bits for DPI in the control channel does not matter. Stated differently, according to Embodiment 1, indicating a DMRS pattern using a DPI makes it possible to flexibly switch between DMRS patterns without any significant drawback.

(Variation 1)

In variation 1, a DPI indicates a DMRS pattern, and a virtual cell ID (VCID) or cell ID (PCID).

Specifically, base station 100 previously indicates, to terminal 200, not only a DMRS pattern that may be specified, but also a virtual cell ID corresponding to the value of each DPI. Base station 100 indicates use of a certain DMRS pattern and the virtual cell ID (or cell ID) corresponding to the DMRS pattern by use of the DPI. Terminal 200 identifies the DMRS pattern and virtual cell ID (or cell ID) on the basis of the DPI and generates a DMRS.

FIG. 12 illustrates a correspondence between the values of DPI, DMRS patterns and virtual cell IDs. When DPI is "00," terminal 200 generates a DMRS using a base sequence corresponding to the legacy DMRS pattern and cell ID with reference to FIG. 12. In addition, when DPI is "10," terminal 200 generates a DMRS using a base sequence corresponding to the reduced DMRS pattern (pattern 2) and virtual cell ID 1 (VCID 1) with reference to FIG. 12. Terminal 200 generates a DMRS in the same manner when DPI is "01" and "11."

As described above, Reduced DMRS is often used when the channel state of terminal 200 is good (e.g., when the distance between terminal 200 and base station 100 is relatively short). Such a good channel state is likely to occur when terminal 200 is connected to a small cell base station. Meanwhile, it is possible that small cell base stations may be deployed unevenly: for example, a large number of small cell base stations are deployed densely; or small cell base stations are deployed sparsely and not densely.

Accordingly, interference control between small cells using virtual cell IDs may be flexibly performed using orthogonalization of interference by indicating the same virtual ID or randomization of interference by indicating different virtual cell IDs to a plurality of small cell base stations. Stated differently, Reduced DMRS and virtual cell IDs are likely to be used simultaneously.

In this respect, as illustrated in FIG. 12, indicating a DMRS pattern and virtual cell ID simultaneously to terminal 200 by base station 100 using a DPI makes it possible to instruct terminal 200 to use both Reduced DMRS and a virtual cell ID by the DPI alone. Thus, interference control between small cells can be more flexibly and appropriately performed while an increase in overhead is minimized.

(Variation 2)

In variation 2, a DPI indicates a DMRS pattern and ON/OFF of a base sequence group hopping.

Base sequence group hopping is a method introduced in Rel. 8 and used for reducing more intercell interference by means of hopping between the group numbers of base sequence groups so as to generate a DMRS using a different base sequence group for each DMRS transmission. Meanwhile, when base sequence group hopping is performed, different base sequences are used for two DMRSs in a PUSCH subframe, which raises a problem in that multiplexing between terminals by means of OCCs cannot be performed. For this reason, the feature to quasi-statically turn ON/OFF the base sequence group hopping by higher layer signaling is added in Rel. 10, thus making possible achieving multiplexing by means of OCCs.

Base station 100 previously indicates not only DMRS patterns that may be specified and but also ON/OFF of base sequence group hopping corresponding to each value of DPI to terminal 200. Base station 100 indicates a DMRS pattern and the ON/OFF of base sequence group hopping corresponding to the DMRS pattern, using the DPI. Terminal 200 identifies the DMRS pattern and the ON/OFF of base sequence group hopping corresponding to the DMRS pattern on the basis of the DPI.

FIG. 13 illustrates a relationship between DPI values, DMRS patterns, and ON/OFF of base sequence group hopping. For example, referring to FIG. 13, when DPI is "00," terminal 200 generates a DMRS using Legacy DMRS and turning ON the base sequence group hopping. In addition, when DPI is "11," terminal 200 generates a DMRS using Reduced DMRS (Pattern 2) and turning OFF the base sequence group hopping. Terminal 200 generates a DMRS in the same manner when DPI is "01" and "10."

Figure 14:
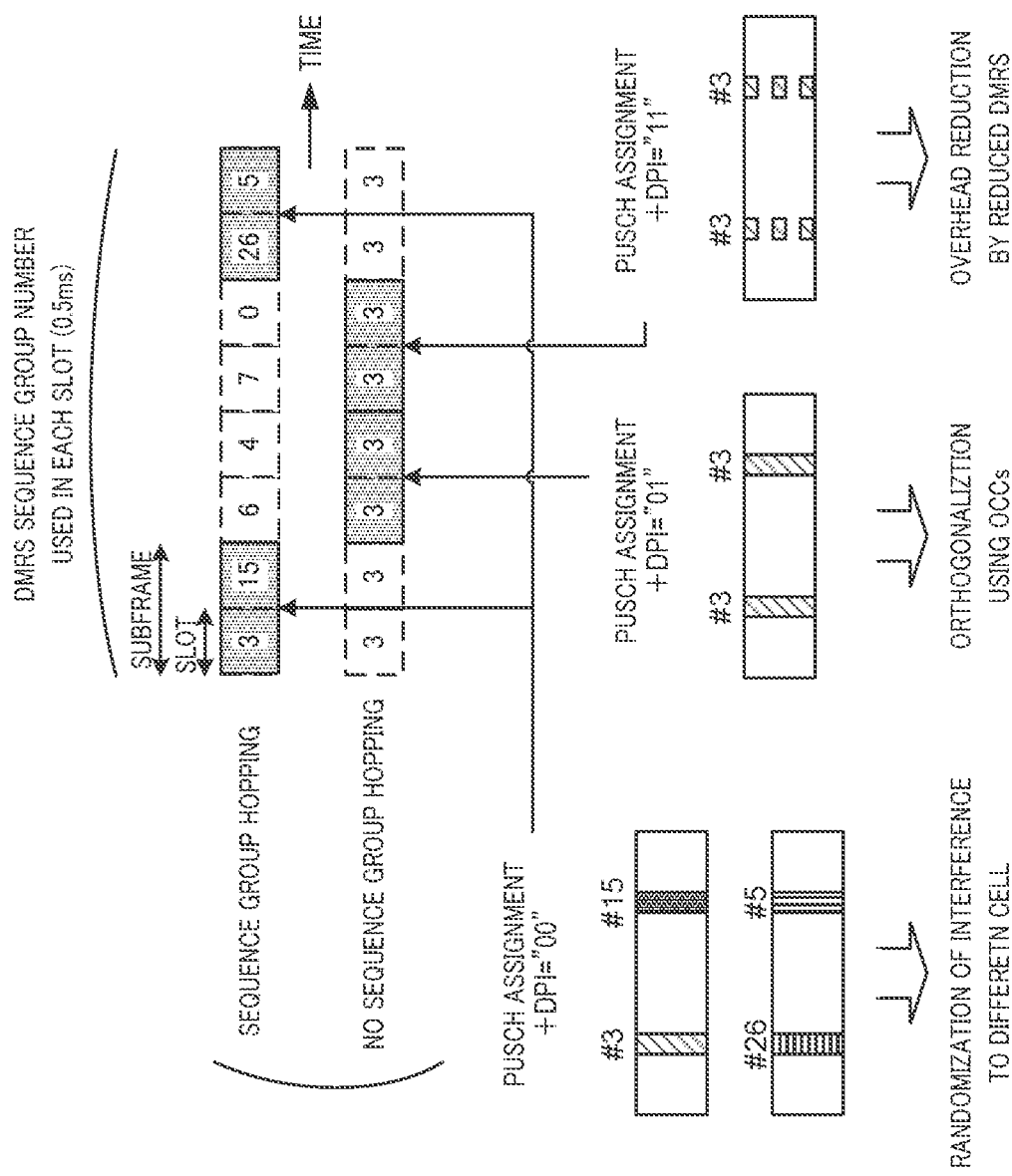
FIG. 14 is a diagram illustrating an example of DMRS pattern indication according to Embodiment 1 of the present disclosure.

FIG. 14 illustrates an example of a case where a DMRS pattern and ON/OFF of the base sequence group hopping are indicated using the DPI illustrated in FIG. 13. FIG. 14 illustrates four subframes, each consisting of two slots.

As illustrated in FIG. 14, since DPI is equal to "00" in the first and fourth subframes, terminal 200 uses Legacy DMRS and performs hopping between base sequence groups of two DMRSs in each of the subframes (sequence group numbers: #3 and #15, and #26 and #5). Accordingly, randomization of interference to a different cell is made possible.

In addition, as illustrated in FIG. 14, since DPI is equal to "01" in the second subframe, terminal 200 generates DMRSs using Legacy DMRS and a sequence determined by the cell ID or virtual cell ID (sequence group number: #3 in this example) without hopping between base sequence groups. Accordingly, orthogonalization of interference by means of OCCs is made possible.

As illustrated in FIG. 14, since DPI is equal to "11" in the third subframe, terminal 200 generates DMRSs using Reduced DMRS without hopping between base sequence groups. Accordingly, overhead reduction by Reduced DMRS is made possible.

Turning ON the base sequence group hopping allows for randomization of interference, but makes orthogonalization of interference by means of OCCs no longer possible. On the other hand, turning OFF the base sequence group hopping allows for orthogonalization by means of OCCs, but does not randomize interference. For this reason, base station 100 indicates a DMRS pattern and ON/OFF of the base sequence group hopping using a DPI at once. Accordingly, terminal 200 can dynamically switch between DMRS patterns and also between ON and OFF of the base sequence group hopping in accordance with the conditions of terminal 200, interference to an adjacent cell, or the presence or absence of a terminal subject to spatial multiplexing. Thus, according to variation 2, it is possible to flexibly minimize interference and increase the throughput.

(Variation 3)

In variation 2 (see, FIG. 14), the sequence determined by the cell ID or virtual cell ID is used in all the slots when base sequence group hopping is OFF (sequence group #3 in FIG. 14). On the other hand, in variation 3, when base sequence group hopping is OFF in a certain subframe, terminal 200 uses a DMRS sequence group to be used in the first slot of the same subframe when the base sequence group hopping is ON, in the two slots of the certain subframe.

Figure 15:
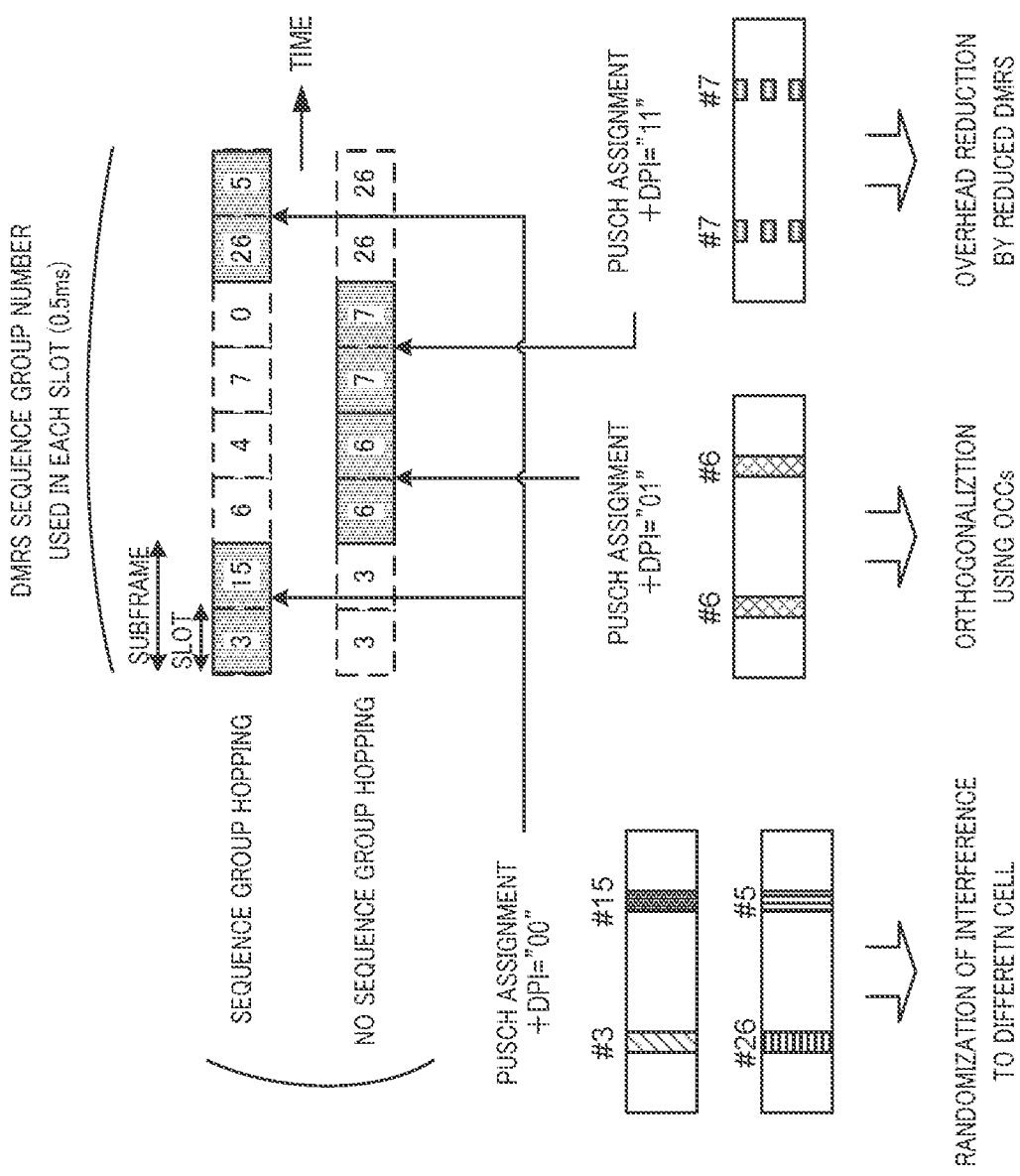
FIG. 15 is a diagram illustrating another example of DMRS pattern indication according to Embodiment 1 of the present disclosure.

FIG. 15 illustrates an example of a case where a DMRS pattern and the ON/OFF of base sequence group hopping are indicated using the DPI illustrated in FIG. 13. In FIG. 15, four subframes are illustrated, as in the case of FIG. 14, and each subframe consists of two slots.

As illustrated in FIG. 15, since DPI is equal to "01" in the second subframe, no hopping is performed between base sequence groups. Meanwhile, the sequence group number of the DMRS used in the first slot of the second subframe when hopping between base sequence groups is performed is #6. Thus, terminal 200 generates DMRSs using Legacy DMRS and the sequence group #6 without hopping between the base sequence groups in the second subframe.

Likewise, as illustrated in FIG. 15, since DPI is equal to "11" in the third subframe, no hopping is performed between base sequence groups. Meanwhile, the sequence group number of the DMRS used in the first slot of the third subframe when hopping between base sequence groups is performed is #7. Thus, terminal 200 generates DMRSs using Reduced DMRS and the sequence group #7 without hopping between base sequence groups in the third subframe.

Specifically, while the DMRS of sequence group number #3 is always used when hopping between sequence groups is OFF in variation 2 (see, FIG. 14), the sequence group number is changed even when hopping between sequence groups is OFF (the second and third subframes) in variation 3 (see, FIG. 15).

Accordingly, switching between the DMRS sequence groups to be used is performed at least every 1 ms (one subframe) for any terminal 200. Thus, in addition to the effects obtained in variation 2, the effect of randomization of interference to an adjacent cell is obtained.

Embodiment 2

(Summary of Communication System)

A communication system according to Embodiment 2 includes base station 100 and one or more terminals 200 as in Embodiment 1 (see, FIG. 6).

In Embodiment 2, unlike Embodiment 1, however, the DPI indicating a DMRS pattern is not used, but RB allocation information and a DMRS pattern are indicated simultaneously by the value of resource indication value (RIV) included in a UL grant. Specifically, a plurality of DMRS patterns are associated with the values of RIV, which is the existing RB allocation information on uplink included in the control information transmitted from base station 100 to terminal 200. Stated differently, DMRS patterns are indicated using the existing RIV.

Specifically, a plurality of DMRS patterns that may be specified are previously indicated to terminal 200, and also DMRS patterns corresponding to the values of RIV are previously indicated to terminal 200. Terminal 200 identifies an RB used for the transmission of PUSCH subframe, on the basis of the value of RIV indicated by base station 100 and determines the DMRS pattern corresponding to the RIV as the DMRS pattern used in the transmission of PUSCH subframe. Incidentally, the plurality of DMRS patterns that may be specified, and the DMRS patterns corresponding to the values of RIV may be previously indicated to terminal 200 by base station 100 via higher layers, or only predetermined combinations may be used.

(Configuration of Base Station 100)

Control section 101 of base station 100 determines a PUSCH subframe assignment to terminal 200. Control section 101 herein determines the value of RB allocation information (RIV) in consideration of both of an RB to be allocated to terminal 200 and a DMRS pattern to be indicated to terminal 200.

(Configuration of Terminal 200)

Control section 205 of terminal 200 indicates RB allocation for the PUSCH transmission to mapping section 212 on the basis of the value of RIV included in the UL grant. Moreover, control section 205 determines the DMRS pattern for the PUSCH transmission on the basis of the value of RIV.

(Operation)

A description will be provided regarding operation of base station 100 and terminal 200 according to Embodiment 2. The processing flow of base station 100 and terminal 200 according to Embodiment 2 is substantially the same as steps (1) to (4).

However, unlike Embodiment 1, the UL grant includes no DPI in Embodiment 2. Instead, base station 100 configures the value of RIV on the basis of the DMRS pattern to be indicated to terminal 200, and terminal 200 determines the DMRS pattern used in the PUSCH subframe on the basis of the value of RIV included in the UL grant.

An RIV is information indicated by the number of bits in accordance with the system bandwidth (e.g., when no frequency hopping for PUSCH is performed, $Log_2(N_{RB}^{UL}(N_{RB}^{UL}+1)/2)$ bits), and the value of RIV is determined on the basis of equation 1 below (when no frequency hopping for PUSCH is performed).

$$\begin{cases} RIV = N_{RB}^{UL}(L_{CRBs} - 1) + RB_{START}, & \text{if } (L_{CRBs} - 1) \le \lfloor N_{RB}^{UL}/2 \rfloor \\ RIV = N_{RB}^{UL}(N_{RB}^{UL} - (L_{CRBs} - 1)) + \\ \quad (N_{RB}^{UL} - 1) - RB_{START} & \text{else} \end{cases} \text{(Equation 1)}$$

In equation 1, $N_{RB}^{UL}$ represents the uplink system bandwidth and $L_{CRBs}$ represents the number of allocation RBs to terminal 200, while $RB_{START}$ represents the RB corresponding to the lowest frequency of the allocation RBs of terminal 200. In addition, equation 1 is used for contiguous band allocation. The value of RIV indicated in equation 1 uniquely defines the number of RBs allocated to terminal 200 and the positions of the RBs (see, FIG. 16). There is a restriction that only multiple numbers of 2, 3, and 5 are selectable for $L_{CRBs}$. For this reason, in the structure of Rel. 11 or before, any value of RIV corresponding to $L_{CRBs}$ other than multiple numbers of 2, 3, and 5 is not indicated.

(Advantageous Effects)

As described above, base station 100 indicates any one of a plurality of DMRS patterns to terminal 200 using the frequency resource allocation information (RIV) indicating the frequency resource allocation information bits included in a UL grant. Terminal 200 identifies the DMRS pattern to be used from the plurality of DMRS patterns on the basis of the value of RIV included in the received UL grant.

As described above, when Reduced DMRS is indicated to terminal 200, it is likely that terminal 200 communicates with a small cell base station. In addition, the number of terminals simultaneously performing communication is likely to be small in a small cell, and the channel quality of terminals communicating with the small cell is likely to be good. For this reason, even if the scheduling granularity in the frequency-domain is reduced, the frequency-domain scheduling gain cannot be increased in small cells. In other words, when the scheduling granularity is reduced to identifying more DMRS patterns, there is almost no influence of the drawback. Accordingly, identifying the DMRS pattern used in terminal 200 in accordance with the value of RIV enables flexible switching between DMRS patterns.

Moreover, in Embodiment 2, the existing RIV is used to indicate DMRS patterns. Accordingly, since no additional bits for indicating DMRS patterns are required, there is no increase in overhead.

Next, a description will be provided in detail regarding specific examples 1 to 4 of indicating and identifying DMRS patterns in base station 100 and terminal 200 in Embodiment 2.

Specific Example 1

Base station 100 configures the value of the number of allocation RBs (i.e., allocation bandwidth) $L_{CRBs}$ in RIV, to be either even or odd in consideration of DMRS patterns. Terminal 200 identifies the DMRS pattern to be used, according to whether the value of the number of allocation RBs (i.e., allocation bandwidth) $L_{CRBs}$ in RIV included in a UL grant is even or odd.

For example, the RIV indicating an odd number of allocation RBs is associated with a legacy DMRS pattern, and the RIV indicating an odd number of RBs is associated with a Reduced DMRS pattern. Specifically, terminal 200 uses Legacy DMRS when an RIV including $L_{CRBs}$ equivalent to an odd number of RBs is indicated by base station 100, while using Reduced DMRS when an RIV including $L_{CRBs}$ equivalent to an even number of RBs is indicated by base station 100.

It should be noted that, the associations between the numbers of allocation RBs represented by $L_{CRBs}$ (even or odd RBs) and whether or not to use Reduced DMRS are previously determined or shared between base station 100 and terminal 200 via higher layer signaling or the like. In addition, the reduced DMRS patterns specified by RIV may be previously determined, or may be indicated to terminal 200 by base station 100 using higher layers or the like.

Figure 17:
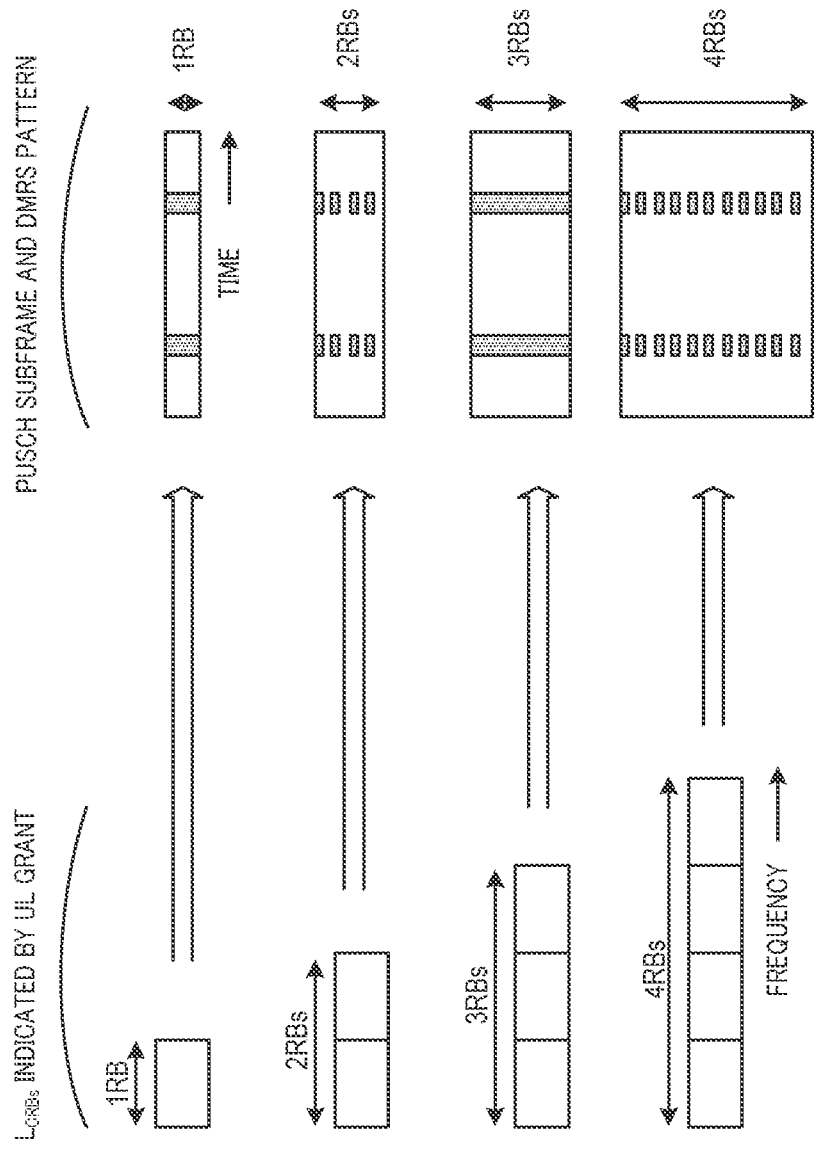
FIG. 17 is a diagram illustrating DMRS patterns corresponding to allocation bandwidths according to Embodiment 2 of the present disclosure.

FIG. 17 illustrates an example of DMRS pattern indication in specific example 1. In FIG. 17, reduced DMRS pattern (3) illustrated in FIG. 4D is used as an example in the case of Reduced DMRS.

As illustrated in FIG. 17, when $L_{CRBs}$ in the RIV indicated by the UL grant is odd (1RB or 3RBs), the legacy DMRS pattern is used as the DMRS pattern. Meanwhile, when $L_{CRBs}$ in the RIV indicated by the UL grant is even (2RBs or 4RBs), reduced DMRS pattern (3) is used as the DMRS pattern.

Although only one kind of reduced DMRS pattern is associated with the case where $L_{CRBs}$ is even RBs, different patterns of a plurality of reduced DMRS patterns may be associated respectively with different values of $L_{CRBs}$ (e.g., 2RBs and 4RBs).

Incidentally, a sequence length corresponding to $L_{CRBs}$ of an integer is defined for the existing DMRS. Accordingly, when $L_{CRBs}$ is odd, a DMRS of a sequence length corresponding to half of $L_{CRBs}$ exists. Meanwhile, when $L_{CRBs}$ is even, a sequence length obtained by dividing $L_{CRBs}$ by power of two (e.g., two) cannot be defined.

For this reason, when $L_{CRBs}$ is even, terminal 200 can use the existing DMRS of a sequence length corresponding to half of $L_{CRBs}$ even when using a reduced DMRS pattern. More specifically, when it is defined that Reduced DMRS is used only when $L_{CRBs}$ is even, and Legacy DMRS is used when $L_{CRBs}$ is odd as illustrated in FIG. 17, terminal 200 can generate a DMRS of a bandwidth equal to half of a PUSCH can be generated only using a DMRS of the existing sequence length. Stated differently, it is unnecessary to define a DMRS of a new sequence length other than the existing sequence lengths for use in Reduced DMRS.

In addition, it is expected that Reduced DMRS is likely to be used in small cells, that the frequency selectively for channel quality is low, and that the number of terminals communicating simultaneously is small. In other words, Reduced DMRS is likely to be used in an environment where there is no drawback of coarse scheduling granularity in the frequency-domain. For this reason, associating the number of allocation RBs (allocation bandwidth) in RIV with a DMRS pattern imposes restrictions on flexibility of RIV, but involves almost no influence of the drawback due to the restrictions, and enables dynamically indicating Reduced DMRS.

Variation of Specific Example 1

In this variation, the RIV indicating an odd number of allocation RBs is associated with this odd number plus one allocation RBs and a reduced DMRS pattern, and the RIV indicating an even number of allocation RBs is associated with the legacy DMRS pattern.

Specifically, when an RIV including $L_{CRBs}$ equivalent to an odd number of RBs is indicated to terminal 200, terminal 200 uses Reduced DMRS assuming that the number of RBs is ($L_{CRBs}$+1), and when an RIV including $L_{CRBs}$ equivalent to an even number of RBs is indicated to terminal 200, terminal 200 uses Legacy DMRS assuming that the number of RBs is $L_{CRBs}$.

It should be noted that, the associations between the numbers of allocation RBs represented by $L_{CRBs}$ (odd or even RBs) and whether or not to use Reduced DMRS are previously determined or shared between base station 100 and terminal 200 via higher layer signaling or the like. In addition, the reduced DMRS patterns specified by RIV may be previously determined, or may be indicated to terminal 200 by base station 100 using higher layers or the like.

Figure 18:
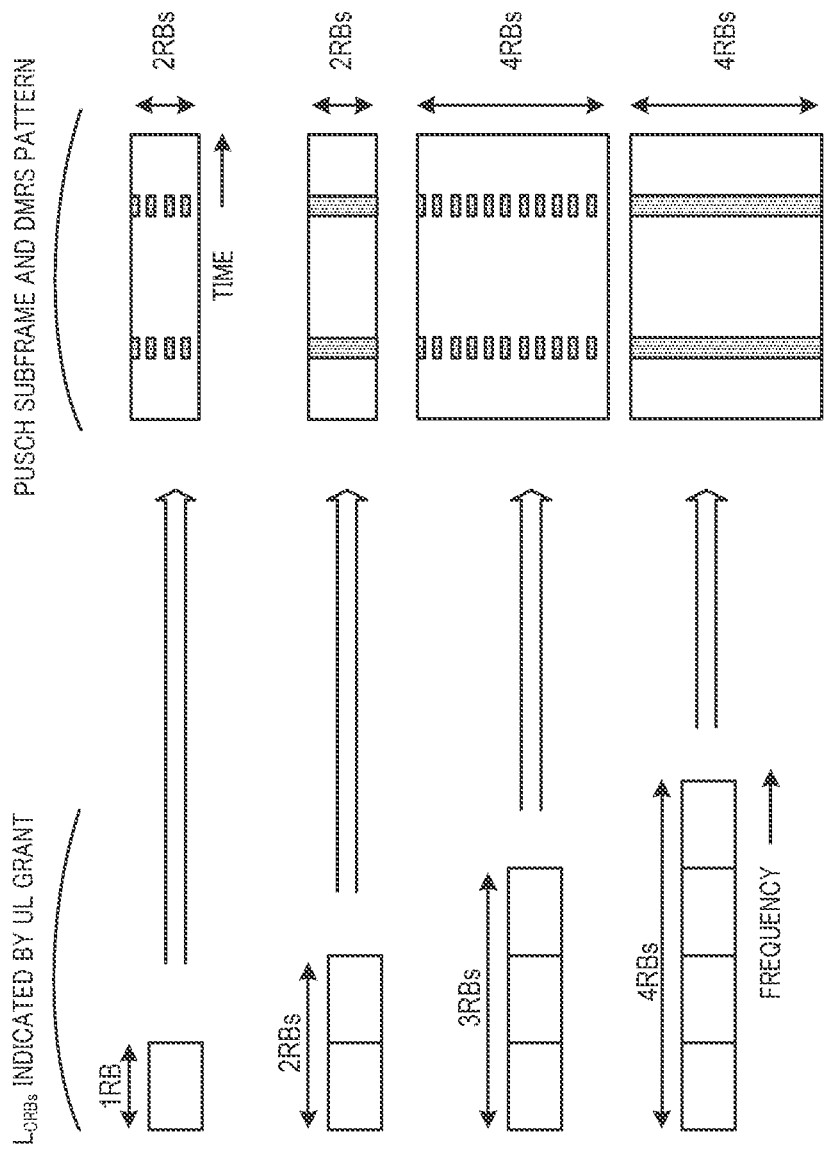
FIG. 18 is a diagram illustrating DMRS patterns corresponding to allocation bandwidths according to Embodiment 2 of the present disclosure.

FIG. 18 illustrates an example of DMRS pattern indication in the variation of specific example 1. As in FIG. 17, reduced DMRS pattern (3) illustrated in FIG. 4D is used as an example in the case of Reduced DMRS.

As illustrated in FIG. 18, when $L_{CRBs}$ in the RIV indicated by the UL grant is even (2RBs or 4RBs), the allocation bandwidth is configured according to $L_{CRBs}$, and the legacy DMRS pattern is used as the DMRS pattern. Meanwhile, as illustrated in FIG. 18, when $L_{CRBs}$ in the RIV indicated by the UL grant is odd (1RB or 3RBs), the allocation bandwidth is configured according to $L_{CRBs}$ plus one (i.e., 2RBs or 4RBs), and reduced DMRS pattern (3) is used as the DMRS pattern.

According to this variation, unlike specific example 1 (see, FIG. 17), there are allocation bandwidths (odd number of allocation RBs) that cannot be specified for terminal 200 to which Reduced DMRS can be indicated, but Legacy DMRS and Reduced DMRS become selectable in the same allocation bandwidths (even number of allocation RBs). More specifically, since terminal 200 can select one DMRS pattern from among a plurality of DMRS patterns including Legacy DMRS and Reduced DMRS in the same allocation bandwidths, there is no need to change a bandwidth for selecting a DMRS pattern. Accordingly, the circuit configuration and algorithm of scheduler can be more simplified.

Incidentally, when an RIV including $L_{CRBs}$ equivalent to an even number of RBs is indicated to terminal 200, terminal 200 may use Legacy DMRS assuming that the number of RBs is ($L_{CRBs}$+1), and when an RIV including $L_{CRBs}$ equivalent to an even number of RBs is indicated to terminal 200, terminal 200 may use Reduced DMRS assuming that the number of RBs is $L_{CRBs}$.

In addition, an RIV indicating an odd number of allocation RBs is associated with this odd number minus one allocation RBs, and a reduced DMRS pattern.

Specific Example 2

Base station 100 configures the value of the number of allocation RBs (allocation bandwidth) $L_{CRBs}$ in RIV in consideration of the DMRS pattern. Terminal 200 identifies the DMRS pattern to be used, in comparison between the value of the number of allocation RBs (allocation bandwidth) $L_{CRBs}$ in RIV included in a UL grant and a predetermined value.

For example, the RIV indicating an allocation bandwidth not greater than predetermined value x is associated with the legacy DMRS pattern, and the RIV indicating an allocation bandwidth greater than predetermined value x is associated with a reduced DMRS pattern. Specifically, terminal 200 uses Legacy DMRS when $L_{CRBs}$ satisfies $0 < L_{CRBs} \leq x$, and uses Reduced DMRS when $L_{CRBs}$ satisfies $x < L_{CRBs} \leq N_{RB}^{UL}$ in the RIV indicated by base station 100.

In other words, the DMRS pattern used by terminal 200 is switched for each range of the bandwidth allocated to terminal 200.

It is assumed that whether or not to use Reduced DMRS when $L_{CRBs}$ satisfies $x < L_{CRBs} \leq N_{RB}^{UL}$ is previously determined or is shared between base station 100 and terminal 200 via higher layer signaling or the like. Moreover, the reduced DMRS patterns specified by $L_{CRBs}$ may be previously determined, or may be indicated to terminal 200 by base station 100 using higher layers or the like.

In addition, it is assumed that predetermined value x ($0 < x < N_{RB}^{UL}$) is previously determined or is shared between base terminal 100 and terminal 200 via higher layer signaling or the like.

Moreover, a plurality of values ($x_1, x_2, \ldots$) may be indicated as x, and the DMRS pattern used by terminal 200 may be switched among a plurality of DMRS patterns in accordance with the value of $L_{CRBs}$.

Figure 20:
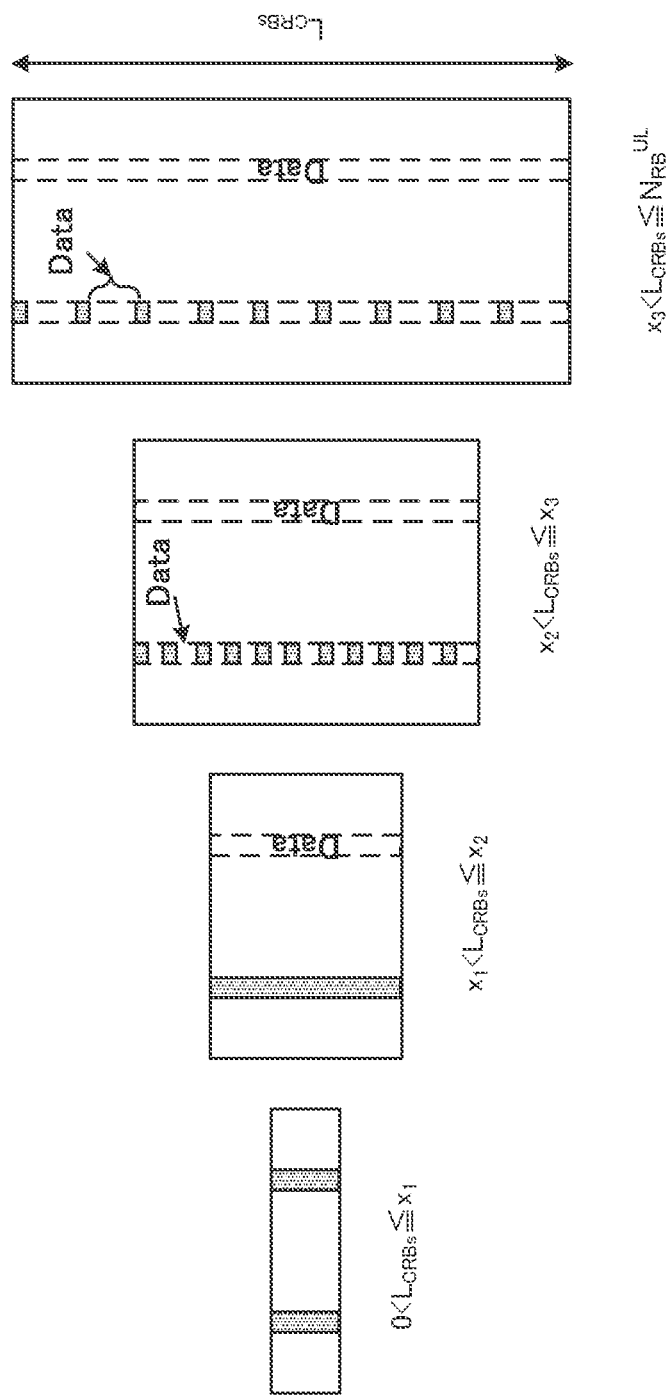
FIG. 20 is a diagram illustrating DMRS patterns corresponding to allocation bandwidths according to Embodiment 2 of the present disclosure.

FIGS. 19 and 20 illustrate an example of DMRS pattern indication when a plurality of predetermined values $x_1, x_2,$ and $x_3$ are used.

In FIG. 19, the following values are configured: $x_1=2$, $x_2=8$, and $x_3=15$, while $N_{RB}^{UL}=25$. With this configuration, when $L_{CRBs}$ satisfies $0 < L_{CRBs} \leq x_1$, (i.e., $L_{CRBs}=1$ to 2), legacy DMRS is used; when $L_{CRBs}$ satisfies $x_1 < L_{CRBs} \leq x_2$, (i.e., $L_{CRBs}=3$ to 8), reduced DMRS pattern (1) is used; when $L_{CRBs}$ satisfies $x_2 < L_{CRBs} \leq x_3$, (i.e., $L_{CRBs}=9$ to 15), reduced DMRS pattern (2) is used; and when $L_{CRBs}$ satisfies $x_3 < L_{CRBs} \leq N_{RB}^{UL}$, (i.e., $L_{CRBs}=16$ to 25), reduced DMRS pattern (3) is used. As illustrated in FIG. 20, reduced DMRS pattern (1) illustrated in FIG. 19 corresponds to reduced DMRS pattern (1) illustrated in FIG. 4B. Reduced DMRS patterns (2) and (3) are each a method in which one of two DMRSs included in the legacy DMRS pattern (FIG. 4A) is replaced with data, and DMRSs each having a sequence length shorter than the allocation bandwidth are mapped to the remaining DMRS frequency resource in a distributed manner in the SC-FDMA symbol.

As described above, in specific example 2, Legacy DMRS is selected when the RIV specifies a bandwidth for the number of RBs not greater than a predetermined value (x in FIGS. 19 and 20), and one DMRS pattern is selected from among one or more reduced DMRS patterns when the RIV specifies a bandwidth for the number of RBs greater than the predetermined value.

Terminal 200 capable of Reduced DMRS is typically one which is connected to a small cell or which has good channel quality. In this case, the bandwidth to be allocated to terminal 200 is likely to be wide. In other words, the better the channel quality of terminal 200 is, the more likely that terminal 200 is allocated a wide band. Moreover, when the channel quality of terminal 200 is good, it is possible to perform channel estimation with sufficient accuracy using less energy or less DMRS resources.

Accordingly, as in specific example 2, the DMRS pattern is changed for each allocation bandwidth of terminal 200, and the DMRS energy or resources are reduced when a wider band is allocated. Thus, the resources that have become available by reducing the DMRS resources can be allocated to data. Specifically, as illustrated in FIGS. 19 and 20, the wider the allocation bandwidth is, the lower the density of DMRS in a subframe will be.

As described above, indicating a wider allocation bandwidth and Reduced DMRS to terminal 200 which has good channel quality and which requires a high data rate, to thereby provide more data resources makes it possible to achieve higher throughput. Meanwhile, indicating a narrow allocation bandwidth and Legacy DMRS to terminal 200 for which high channel estimation accuracy is required, or terminal 200 for which MU-MIMO with a legacy terminal is required makes it possible to improve the channel estimation accuracy or application of MU-MIMO.

Specific Example 3

Base station 100 configures the value of lowest RB position $RB_{START}$ of the allocation bandwidth in the RIV in consideration of the DMRS pattern. Terminal 200 specifies the DMRS pattern to be used, in comparison between the value of RB position $RB_{START}$ and a predetermined value in the RIV included in the UL grant.

For example, the RIV in which the lowest frequency of allocation band is higher than predetermined value y is associated with the legacy DMRS pattern, and the RIV in which the lowest frequency of allocation band is not higher than predetermined value y is associated with a reduced DMRS pattern. Specifically, terminal 200 uses Reduced DMRS when $RB_{START}$ satisfies $0 \leq RB_{START} \leq y$ in the RIV indicated by base station 100, and terminal 200 uses Legacy DMRS when $RB_{START}$ satisfies $y < RB_{START} < N_{RB}^{UL}$ in the RIV indicated by base station 100.

In other words, the DMRS pattern used by terminal 200 is switched for each start position of the band allocated to terminal 200.

It is assumed that whether or not to use Reduced DMRS when $RB_{START}$ satisfies $0 \leq RB_{START} \leq y$ is previously determined or is shared between base station 100 and terminal 200 via higher layer signaling or the like. Moreover, the reduced DMRS patterns specified by $RB_{START}$ may be previously determined, or may be indicated to terminal 200 by base station 100 using higher layers or the like.

In addition, it is assumed that predetermined value y $(0 \leq y < N_{RB}^{UL})$ is previously determined or is shared between base terminal 100 and terminal 200 via higher layer signaling or the like.

Moreover, a plurality of values $(y_1, y_2 \ldots)$ may be indicated as y, and the DMRS pattern used by terminal 200 may be switched among a plurality of DMRS patterns in accordance with the value of $RB_{START}$.

Figure 22:
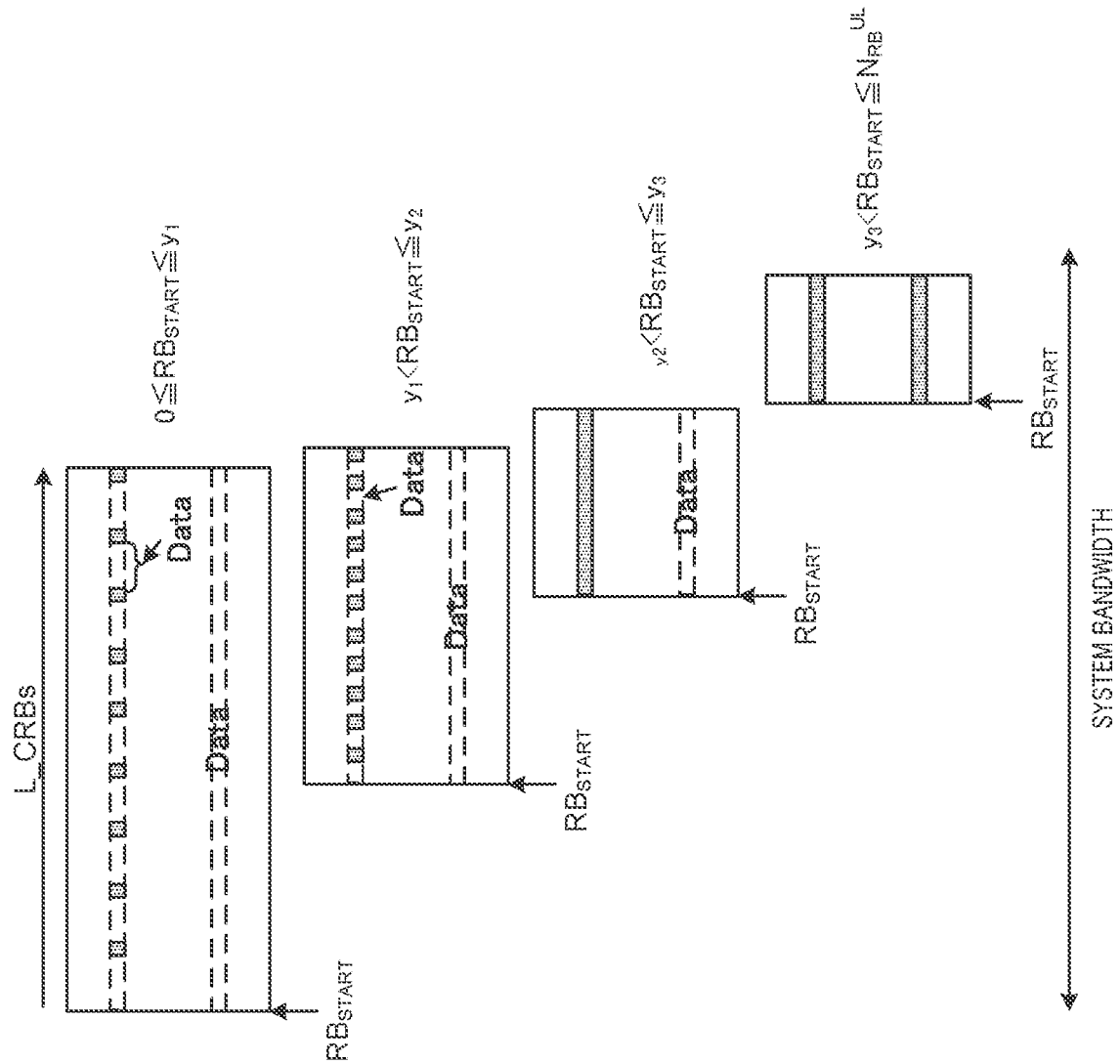
FIG. 22 is a diagram illustrating DMRS patterns corresponding to the start positions of allocation bandwidths according to Embodiment 2 of the present disclosure.

FIGS. 21 and 22 illustrate an example of DMRS pattern indication when a plurality of predetermined values $y_1$, y, and $y_3$ are used.

In FIG. 21, the following values are configured: $y_1=10$, $y_2=15$, and $y_3=20$, while $N_{RB}^{UL}=25$. With this configuration, when $RB_{START}$ satisfies $0 < RB_{START} \leq y_1$, (i.e., $RB_{START}=0$ to 10), reduced DMRS pattern (3) is used; when $RB_{START}$ satisfies $y_1 < RB_{START} \leq y_2$, (i.e., $RB_{START}=11$ to 15), reduced DMRS pattern (2) is used; when $RB_{START}$ satisfies $y_2 < RB_{START} \leq y_3$, (i.e., $RB_{START}=16$ to 20), reduced DMRS pattern (1) is used; and when $RB_{START}$ satisfies $y_3 < RB_{START} \leq N_{RB}^{UL}$, (i.e., $RB_{START}=21$ to 25), Legacy DMRS is used. As in the case of specific example 2, as illustrated in FIG. 22, reduced DMRS pattern (1) illustrated in FIG. 21 corresponds to reduced DMRS pattern (1) illustrated in FIG. 4B. Reduced DMRS patterns (2) and (3) are each a method in which one of two DMRSs included in the legacy DMRS pattern (FIG. 4A) is replaced with data, and DMRSs each having a sequence length shorter than an allocated bandwidth are distributedly mapped to the remaining DMRS frequency resource in the SC-FDMA symbol.

As described above, in specific example 3, Legacy DMRS is selected when the RIV specifies an RB start position greater than a predetermined value ($y_3$ in FIGS. 21 and 22), and one DMRS pattern is selected from among one or more reduced DMRS patterns when the RIV specifies an RB start position not greater than the predetermined value.

Figure 16:
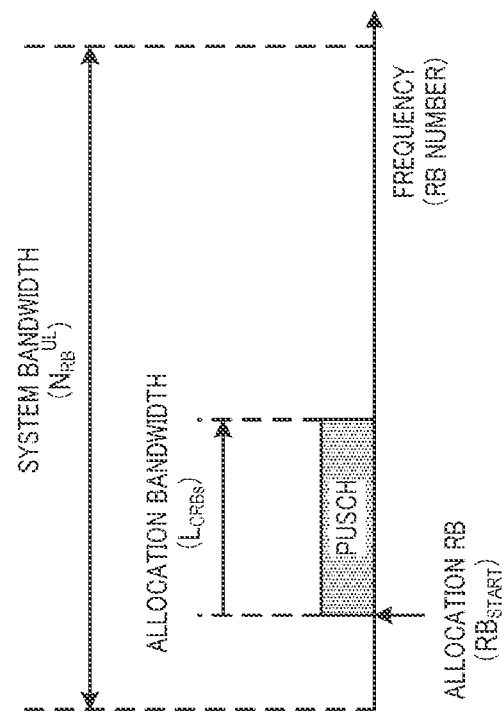
FIG. 16 is a diagram illustrating a relationship between PUSCH band allocation and each parameter of RIV according to Embodiment 2 of the present disclosure.

As described above, PUSCH resource allocation is indicated by the start position of allocation RB (RB number of the lowest frequency (origin)) and the bandwidth from the start position (number of RBs contiguous in the higher frequency direction) (see, FIG. 16). Accordingly, in order for base station 100 to allocate a wide band to terminal 200, base station 100 needs to indicate an RIV in such a way that start position $RB_{START}$ corresponds to a low frequency RB number (see, FIG. 22). In addition, it is expected that Reduced DMRS is likely to be indicated to terminal 200 having good channel quality and is effective in an environment where RB allocation of wider band is performed.

Meanwhile, in variation 3, Reduced DMRS is indicated when $RB_{START}$ corresponds to a low frequency RB number, and Legacy DMRS is indicated when $RB_{START}$ corresponds to a high frequency RB number. According to specific example 3, base station 100 can perform RB allocation of a wide band to terminal 200 when indicating Reduced DMRS and can also perform RB allocation of a narrow band to terminal 200 when indicating Legacy DMRS.

Accordingly, terminal 200 can use Reduced DMRS when allocated RBs of a wider band. Thus, it is possible to reduce the overhead of terminal 200 in such a good state that a wide band can be allocated, and thereby to achieve higher throughput.

Moreover, in specific example 3, base station 100 can concentrate, in high frequency RBs, resource allocation to terminal 200 to which Legacy DMRS is indicated. Thus, interference between a legacy terminal and a terminal capable of Reduced DMRS (terminal allocated low frequency RBs) can be prevented.

Specific Example 4

As described above, for PUSCHs of Rel. 11 or before, bandwidth $L_{CRBs}$ that can be indicated by a UL grant is limited to the number of RBs equal to multiple numbers of 2, 3, and 5. Accordingly, some values of RIV are not indicated in such a case where the bandwidth ($L_{CRBs}$) indicates 7RBs, for example.

For this reason, in Specific Example 4, base station 100 indicates the use of Reduced DMRS to terminal 200 using the values of RIV not used in PUSCHs of Rel. 11 or before. Specifically, a plurality of DMRS patterns are associated respectively with the values of RIV corresponding to bandwidths other than the bandwidths allocatable by RIV (i.e., bandwidths that cannot be allocated).

Specifically, terminal 200 determines one reduced DMRS pattern from among one or more reduced DMRS patterns when the RIV indicated by base station 100 has a value other than the number of RBs (bandwidth) equal to a multiple number of 2, 3, and 5.

It should be noted that, whether or not to use Reduced DMRS when the RIV not used in PUSCHs of Rel. 11 or before is indicated is previously determined or shared between base station 100 and terminal 200 via higher layer signaling or the like. In addition, the reduced DMRS patterns specified by RIV may be previously determined, or may be indicated to terminal 200 by base station 100 using higher layers or the like.

In addition, it is assumed that the values of $L_{CRBs}$ and $RB_{START}$ in the RIV indicating the reduced DMRS patterns are previously indicated via higher layer signaling. Alternatively, the values of $L_{CRBs}$ and $RB_{START}$ in the RIV indicating the reduced DMRS patterns may be used as $L_{CRBs}$ and $RB_{START}$ identifiable from the values of the RIV and corresponding to the values of the RIV that may be actually indicated. In this case, Reduced DMRS indication and flexible scheduling can be achieved simultaneously.

As described above, using the values of RIV not used as allocation RB information for DMRS pattern indication make it possible to indicate Reduced DMRS to terminal 200 from base station 100 while the flexibility of frequency scheduling for PUSCHs of Rel. 11 and before.

Embodiment 3

(Summary of Communication System)

A communication system according to Embodiment 3 includes base station 100 and one or more terminals 200 as in Embodiment 1 (see, FIG. 6).

However, unlike Embodiment 1, the DPI indicating a DMRS pattern is not used, and a DMRS pattern is indicated by the value of an A-SRS trigger bit (SRS request field) included in a UL grant. Specifically, a plurality of DMRS patterns are associated respectively with the values of the existing Aperiodic SRS trigger bit included in control information transmitted from base station 100 to terminal 200.

The A-SRS trigger bit is a bit for indicating A-SRS transmission at predetermined available transmission timing. Specifically, in Embodiment 3, the A-SRS trigger bit indicates the presence or absence of A-SRS transmission request and a DMRS pattern, simultaneously. Stated differently, a DMRS pattern is indicated using the existing A-SRS trigger.

More specifically, a plurality of DMRS patterns that may be specified are previously indicated to terminal 200, and the DMRS patterns corresponding to the values of A-SRS trigger bit are previously indicated to terminal 200. Terminal 200 identifies the A-SRS transmission timing and determines the DMRS pattern corresponding to the A-SRS trigger bit as the DMRS pattern used in the PUSCH subframe, on the basis of the value of the A-SRS trigger bit indicated by base station 100. It should be noted that, the plurality of DMRS patterns that may be specified, and the DMRS patterns corresponding to the values of A-SRS trigger bit are previously indicated to terminal 200 by base station 100 via higher layers or the like, or only predetermined combinations may be used.

The A-SRS transmission timing indicated by an A-SRS trigger bit and the A-SRS transmission timing that can be indicated by a UL grant do not have to be necessarily the same. For example, the A-SRS transmission timing may be commonly used in the entire cell, and the PUSCH transmission timing may be set to the timing after elapse of a predetermined period of time from reception of a UL grant. Accordingly, SRS interference control between terminals can be easily performed while delay in uplink data is minimized.

(Configuration of Base Station 100)

Control section 101 of base station 100 determines PUSCH subframe assignment for terminal 200. Control section 101 section herein determines the value of A-SRS trigger bit in consideration of both of the presence or absence of an A-SRS transmission request to terminal 200 and the DMRS pattern to be indicated to terminal 200.

(Configuration of Terminal 200)

Control section 205 of terminal 200 determines the presence or absence of A-SRS transmission for the next A-SRS transmission timing on the basis of the value of A-SRS trigger bit included in the UL grant and indicates the determination result to SRS generating section 209. Moreover, control section 205 determines the DMRS pattern for PUSCH transmission on the basis of the value of the A-SRS trigger bit.

(Operation)

A description will be provided regarding the operation of base station 100 and terminal 200 according to Embodiment 3. The processing flow of base station 100 and terminal 200 according to Embodiment 3 is substantially the same as steps (1) to (4).

However, unlike Embodiment 1, the UL grant includes no DPI in Embodiment 3. Instead, base station 100 configures the value of A-SRS trigger bit on the basis of the DMRS pattern to be indicated to terminal 200, while terminal 200 determines the DMRS pattern used in the PUSCH subframe, on the basis of the value of the A-SRS trigger bit included in the UL grant.

The number of DMRS patterns selectable by terminal 200 differs depending on the number of A-SRS trigger bits. FIG. 23A illustrates an example of DMRS pattern indication used when the number of A-SRS trigger bits is one, while FIG. 23B illustrates an example of DMRS pattern indication used when the number of A-SRS trigger bits is two.

For example, when the value of A-SRS trigger bit is "0," no A-SRS transmission request (no trigger) and Legacy DMRS are indicated as illustrated in FIG. 23A (in the case of one bit). When the value of A-SRS trigger bit is "1," the presence of A-SRS transmission request and reduced DMRS pattern (1) are indicated.

When the value of A-SRS trigger bit is "00," no A-SRS transmission request and Legacy DMRS are indicated as illustrated in FIG. 23B (in the case of two bits). When the value of A-SRS trigger bit is "01," the presence of A-SRS transmission request and reduced DMRS pattern (1) are indicated. Likewise, when the value of A-SRS trigger bit is "10," the presence of A-SRS transmission request and Legacy DMRS are indicated, and when the value of A-SRS trigger bit is "11," no A-SRS transmission request and reduced DMRS pattern (2) are indicated.

As described above, an A-SRS transmission request and a DMRS pattern are simultaneously indicated to terminal 200 by the value of A-SRS trigger bit included in the UL grant. In addition, when the number of A-SRS trigger bits is two or more (see, e.g., FIG. 23B), A-SRSs having different configurations (1st SRS parameter set and 2nd SRS parameter set in FIG. 23B) and DMRS patterns can be configured in the respective values of the trigger bit. It is assumed that the configurations of A-SRSs and DMRS parameters corresponding to the respective values of the A-SRS trigger bits can be independently configured.

(Advantageous Effects)

As described above, base station 100 and terminal 200 perform indication and selection of DMRS patterns through associations between the values of A-SRS trigger bit and DMRS patterns.

In LTE, periodic SRS (P-SRS), which is transmitted periodically without any trigger bit, is defined. When this P-SRS transmission period is short, the need for A-SRS transmission requests is supposed to be low. When the need for A-SRS transmission requests is low, base station 100 and terminal 200 can use the A-SRS trigger bit for DMRS pattern indication bit as in Embodiment 3. As a result, a DMRS pattern suitable for terminal 200 can be selected from among a plurality of DMRS patterns including Legacy DMRS and Reduced DMRS patterns without any increase in overhead as in Embodiment 1.

Embodiment 4

(Summary of Communication System)

A communication system according to Embodiment 4 includes base station 100 and one or more terminals 200 as in Embodiment 1 (see, FIG. 6).

However, unlike Embodiment 1, the DPI indicating a DMRS pattern is not used, and switching between DMRS patterns is performed in accordance with a downlink control channel (PDCCH or each EPDCCH set) on which a UL grant is transmitted in Embodiment 4. Specifically, a plurality of DMRS patterns are associated respectively with a plurality of control channels used for transmission of control information to be transmitted to terminal 200 from base station 100.

Specifically, a plurality of DMRS patterns that may be specified are previously indicated to terminal 200, and also DMRS patterns corresponding to the control channels (PDCCH or each EPDCCH set) are previously indicated to terminal 200. Terminal 200 determines the DMRS pattern corresponding to the control channel used for transmission of a UL grant indicated by base station 100, as the DMRS pattern used in the transmission of PUSCH subframe. Incidentally, the plurality of DMRS patterns that may be specified, and the DMRS patterns corresponding to the control channels may be previously indicated to terminal 200 by base station 100 via higher layers, or only predetermined combinations may be used.

(Configuration of Base Station 100)

Specifically, control section 101 of base station 100 determines PUSCH subframe assignment for terminal 200. Control section 101 herein determines mapping of a control signal in consideration of both of a control channel (PDCCH and EPDCCH set) to which the control signal for terminal 200 (including a UL grant) is mapped, and the DMRS pattern to be indicated to terminal 200.

(Configuration of Terminal 200)

Control section 205 of terminal 200 determines the DMRS pattern for PUSCH transmission according to whether the control channel on which the UL grant is transmitted is a PDCCH or EPDCCH set.

(Operation)

A description will be provided regarding the operation of base station 100 and terminal 200 according to Embodiment 2. The processing flow of base station 100 and terminal 200 is substantially the same as steps (1) to (4).

However, unlike Embodiment 1, the UL grant includes no DPI. Instead, base station 100 configures the control channel used for transmission of a UL grant on the basis of a DMRS pattern to be indicated to terminal 200, and terminal 200 determines the DMRS pattern used in the PUSCH subframe on the basis of the control channel (PDCCH or EPDCCH set) used for the transmission of UL grant.

It should be noted that, regarding the configuration of an EPDCCH set, only one or more than one EPDCCH set may be configured. FIG. 24 illustrates an example of DMRS pattern indication used when a PDCCH and three EPDCCH sets are configured.

In FIG. 24, terminal 200 blind-decodes three types of EPDCCH sets in addition to a PDCCH. Terminal 200 determines, according to in which control channel the UL grant is successfully decoded, the DMRS pattern in the PUSCH transmission indicated by the UL grant.

As illustrated in FIG. 24, when a UL grant is transmitted using a PDCCH or EPDCCH set 1, terminal 200 determines that Legacy DMRS is indicated. When a UL grant is transmitted using EPDCCH set 2, terminal 200 determines that reduced DMRS pattern (1) is indicated, and when a UL grant is transmitted using EPDCCH set 3, terminal 200 determines that Reduced DMRS pattern (2) is indicated.

(Advantageous Effects)

As described above, base station 100 and terminal 200 perform indication and selection of DMRS patterns through associations between the control channels on which a UL grant is transmitted, and DMRS patterns.

Macro cell base stations are likely to use PDCCHs for transmission of a UL grant because PDCCHs provide a wide coverage and are supported by terminals compliant with existing standard (Rel. 8), Meanwhile, regarding EPDCCHs, a plurality of EPDCCH sets (two EPDCCH sets in Rel. 11) can be configured as blind-decoding targets. Accordingly, such operation may be possible in which a macro cell base station and a small cell base station are associated with different EPDCCH sets, and a UL grant is transmitted from a different base station according to the conditions of terminal 200. As described herein, the operation is which a different control channel (or different EPDCCH set) is configured for each of a plurality of base stations (or transmission/reception points) capable of communicating with terminal 200 may be possible.

For example, such operation is possible in which a PDCCH and EPDCCH set 1 are used for transmission of a UL grant from a macro cell base station, which has a wide coverage and is highly reliable, and EPDCCH sets 2 and 3 are used for transmission of a UL grant from a small cell base station located near terminal 200. In this operation, the control channels (PDCCH and EPDCCH set 1) used for transmission of a UL grant by a macro cell base station are associated with a legacy DMRS pattern, while the control channels (EPDCCH sets 2 and 3) used for transmission of a UL grant by a small cell base station is associated with reduced DMRS patterns.

As described above, associating the control channels used for transmission of a UL grant with DMRS patterns makes it possible to achieve operation which allows terminal 200 to use Reduced DMRS in communication with a specific base station (transmission and reception point). Accordingly, switching between DMRS patterns is made possible without any increase in overhead and without adding any restrictions to the control bits included in a UL grant.

Embodiment 5

(Summary of Communication System)

A communication system according to Embodiment 5 includes base station 100 and one or more terminals 200 as in Embodiment 1 (see, FIG. 6).

However, unlike Embodiment 1, the DPI indicating a DMRS pattern is not used, but the value of cyclic shift indication bit (CS field (or cyclic shift indicator)) included in a UL grant is used to indicate a DMRS pattern in Embodiment 5. Specifically, a plurality of DMRS patterns are associated respectively with the values of the existing CS field included in control information to be transmitted to terminal 200 from base station 100.

The CS field is a bit indicated by a UL grant and used to indicate a cyclic shift value and the OCC index of an OCC applied to a DMRS for PUSCH transmission. Specifically, the CS field indicates a cyclic shift value and the OCC index of an OCC applied to a DMRS and a DMRS pattern simultaneously. Stated differently, the DMRS pattern is indicated using the existing CS field.

Specifically, a plurality of DMRS patterns that may be specified are previously indicated to terminal 200, and the DMRS patterns corresponding to the values of CS field are previously indicated to terminal 200. Terminal 200 identifies the cyclic shift value and OCC index and determines the DMRS pattern corresponding to the CS field as the DMRS pattern used in the PUSCH subframe, on the basis of the CS field value indicated by base station 100. It should be noted that, the plurality of DMRS patterns that may be specified, and the DMRS patterns corresponding to the values of CS field are previously indicated to terminal 200 by base station 100 via higher layers or the like, or only predetermined combinations may be used.

(Configuration of Base Station 100)

Control section 101 of base station 100 determines PUSCH subframe assignment for terminal 200. Control section 101 herein determines the value of CS field in consideration of the cyclic shift value and OCC index for the DMRS of terminal 200, and the DMRS pattern to be indicated to terminal 200.

(Configuration of Terminal 200)

Control section 205 of terminal 200 identifies the cyclic shift value and OCC index for the DMRS on the basis of the value of CS field included in the UL grant and indicates the information to DMRS generating section 208. Moreover, control section 205 determines the DMRS pattern for PUSCH transmission on the basis of the value of CS field and indicates the DMRS pattern to DMRS generating section 208.

(Operation)

A description will be provided regarding the operation of base station 100 and terminal 200 according to Embodiment 5. The processing flow of base station 100 and terminal 200 is substantially the same as steps (1) to (4).

However, unlike Embodiment 1, the UL grant includes no DPI in Embodiment 5. Instead, base station 100 configures the value of CS field on the basis of the DMRS pattern to be indicated to terminal 200, and terminal 200 determines the DMRS pattern used in the PUSCH subframe on the basis of the value of CS field included in the UL grant.

FIG. 25 illustrates an example of DMRS pattern indication using the CS field (3 bits). In FIG. 25, $\lambda$ represents a layer number. In addition, the cyclic shift value that can be indicated using the CS field is 0 to 11, and the OCC index is 0 and 1. OCC index 0 corresponds to [+1 +1], and OCC index 1 corresponds to [+1 −1].

As illustrated in FIG. 25, the values of CS field 000, 010, and 111 are associated with Legacy DMRS, and the values of CS field 011 and 100 are associated with reduced DMRS pattern (1) while the values of CS field 101 and 110 are associated with reduced DMRS pattern (2).

(Advantageous Effects)

As described above, base station 100 and terminal 200 perform indication and selection of DMRS patterns through associations between the values of CS field and DMRS patterns.

As described above, Reduced DMRS is likely to be used when terminal 200 is connected to a small cell base station and when the channel quality of terminal 200 is sufficiently good. It is assumed that the number of terminals in such a situation is small and that interference to another cell is low in such a situation. In other words, Reduced DMRS is likely to be used in a situation where the need for orthogonalization using CS and OCCs and interference control is low. Accordingly, although certain restrictions are imposed on indication of CS/OCCs because a DMRS pattern is indicated simultaneously with CS/OCCs using the CS field, there is almost no influence of drawback due to the restrictions, and switching between DMRS patterns can be appropriately performed. In addition, since DMRS patterns are indicated using the existing CS field, there is no increase in overhead because of no additional bits.

In Embodiment 5, application of a DMRS pattern other than Legacy DMRS (i.e., application of reduced DMRS patterns) may be limited to a case where the number of layers (transmission rank) is equal to one (i.e., $\lambda=0$). Specifically, when the number of layers (transmission rank) is equal to one, terminal 200 (control section 205) determines a specific DMRS pattern to be used by terminal 200, on the basis of the CS field, and when the number of layers (transmission rank) is at least two, terminal 200 determines the legacy DMRS pattern as the specific DMRS pattern to be used by terminal 200 regardless of the value of CS field.

FIG. 26 illustrates a case where application of reduced DMRS patterns is limited to $\lambda=0$ (number of layers equal to one). In FIG. 26, when the number of layers is one ($\lambda=0$), the reduced DMRS pattern associated with the CS field is used, but when the number of layers is at least 2 ($\lambda=1$ to 3), Legacy DMRS is used instead of the reduced DMRS pattern associated with the CS field.

When the number of layers is large, simultaneous transmission (multiplexing) of a plurality of pieces of data from different layers using the same time and frequency resources makes it possible to achieve higher throughput. In this transmission, a DMRS is also multiplexed, so that it is likely to be affected by a channel estimation error. Accordingly, when the number of layers is large, further improvement in throughput can be expected by using Reduced DMRS as in the case where the number of layers is one, but correctly receiving data without retransmission by performing accurate channel estimation is more preferable to slight improvement in resource efficiency obtained by use of Reduced DMRS. In addition, when the number of layers is large, a high data rate is achievable without relying on Reduced DMRS. Accordingly, as illustrated in FIG. 26, switching between DMRS patterns in accordance with the number of layers allows an appropriate DMRS in accordance with the number of layers to be used.

It should be noted that, changing a DMRS in accordance with a search space on which format of a UL grant is transmitted can achieve the advantageous effects obtained in Embodiment 5. For example, a UL grant includes DCI format 0, which indicates single-layer transmission, and DCI format 4, which is capable of indicating at least two-layer transmission. Accordingly, it is possible to employ a configuration in which Legacy DMRS is used regardless of the value of CS field for a UL grant indicating single-layer transmission (e.g., DCI format 0), while Reduced DMRS is used with some values of the CS field for a UL grant (e.g., DCI format 4), which is capable of indicating at least two-layer transmission. Alternatively, control channels used for transmitting a UL grant include a common search space (CSS), which indicates single-layer transmission, and a UE-specific search space (USS), which is capable of indicating at least two-layer transmission. Accordingly, Legacy DMRS may be used regardless of the value of CS field for common search space (CSS), which indicates single-layer transmission, while Reduced DMRS may be used with some values of the CS field for a UE-specific search space (USS), which is capable of indicating at least two-layer transmission.

Embodiment 6

A communication system according to Embodiment 6 includes base station 100 and one or more terminals 200 as in Embodiment 1 (see, FIG. 6).

However, unlike Embodiment 1, the DPI indicating a DMRS pattern is not included in a UL grant, but is transmitted as a control signal different from the UL grant on a control channel.

In the following description, a control signal for a DPI consisting of two bits is called DCI format 3d, while a control signal for a DPI consisting of one bit is called DCI format 3dA.

Specifically, base station 100 transmits DCI format 3d or DCI format 3dA as a DPI. Meanwhile, terminal 200 blind-decodes each DCI format 3d/3dA, and when successfully decoding DCI format 3d/3dA and finding a DPI in the format, terminal 200 uses the DMRS pattern indicated by the DPI.

Base station 100 previously indicates use of DCI format 3d/3dA and the DMRS patterns that may be specified by a DPI of DCI format 3d/3dA to terminal 200. In addition, base station 100 previously indicates a pseudo terminal-ID required for decoding DCI format 3d/3dA to terminal 200. The pseudo terminal-ID may be a value shared among a plurality of terminals 200. Base station 100 transmits DCI format 3d/3dA with a UL grant. The transmitted DCI format 3d/3dA includes a DPI intended for one or more terminals 200, and CRC bits masked by a pseudo terminal-ID are added. To put it differently, the control signal transmitted from base station 100 to terminal 200 includes a DPI and UL grant, and masking (scrambling) different from masking applied to the UL grant is applied to the DPI.

Terminal 200 blind-decodes the DCI format 3d/3dA in addition to the UL grant. During the blind-decoding, terminal 200 uses the CRC masked using the terminal ID of terminal 200 to determine success or failure of decoding the UL grant, and uses the CRC masked using the pseudo terminal-ID to determine success or failure of decoding the DCI format 3d/3dA. Upon succeeding in decoding the UL grant and DCI format 3d/3dA at the same time, terminal 200 selects the DMRS pattern according to the value of DPI intended for terminal 200 included in DCI format 3d/3dA and transmits a PUSCH assigned by the UL grant.

Base station 100 receives the PUSCH transmitted by terminal 200 and decodes the PUSCH. It should be noted that, since base station 100 cannot determine whether DCI format 3d/3dA has been correctly decoded by terminal 200, base station 100 sequentially decodes PUSCH while assuming that the PUSCH is transmitted using any of Legacy DMRS and the DMRS patterns indicated by the DPI.

As described, in Embodiment 6, a DPI is transmitted and received using a control signal (DCI format 3d/3dA) to which scrambling different from that applied to a UL grant is applied, and switching between DMRS patterns is performed in accordance with the value of DPI.

As described above, while a UL grant in Rel. 11 or before is used without any change, Reduced DMRS can be indicated using a different control signal. Thus, base station 100 can perform operation using a scheduler of Rel. 11 or before for terminals using Legacy DMRS and indicate a DMRS pattern, using an independent control signal, only to terminals using Reduced DMRS. Specifically, adding the features of DCI format 3d/3dA to the scheduler of conventional base station 100 alone makes it possible to indicate Reduced DMRS. As a result, implementation of base station 100 becomes easy.

Figure 27:
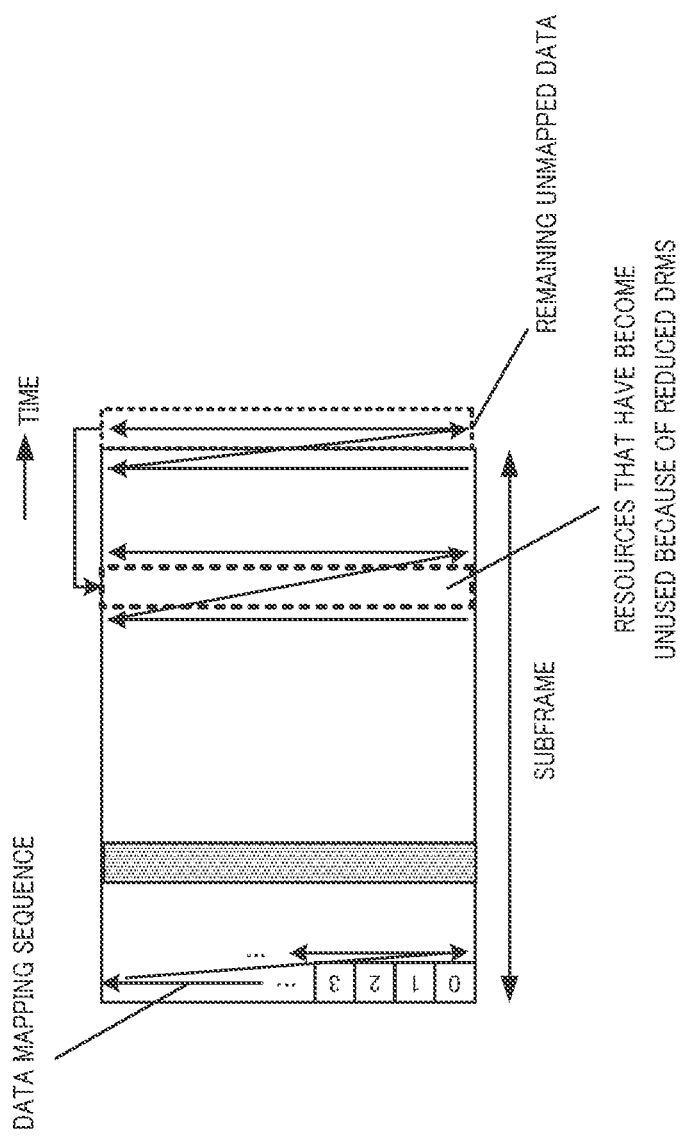
FIG. 27 is a diagram illustrating a data mapping sequence according to Embodiment 6 of the present disclosure.

Incidentally, when terminal 200 uses Reduced DMRS, a large amount of transmission data is transmitted as compared with when terminal 200 uses Legacy DMRS. When using Reduced DMRS, terminal 200 can perform mapping of transmission data in the same manner as when terminal 200 uses Legacy DMRS (i.e., maps no transmission data to resources that have become unused because of Reduced DMRS) and then maps the remaining transmission data to the resources that have become unused because of Reduced DMRS. FIG. 27 illustrates an example of this data mapping sequence. When Reduced DMRS is used, the amount of transmission data is determined in accordance with the DMRS pattern. In this case, as illustrated in FIG. 27, data is first mapped to the top of a subframe as in Legacy DMRS. Some transmission data remains unmapped because of application of Reduced DMRS. Accordingly, the remaining unmapped data is mapped lastly to the resources that have become unused because of Reduced DMRS.

With this configuration, the data mapping sequence in the resources other than the resources to which data is newly mapped because of Reduced DMRS (i.e., resources that have become unused because of Reduced DMRS) is identical to the data mapping sequence when Legacy DMRS is used. Thus, even when base station 100 cannot determine whether or not terminal 200 has successfully decoded DCI format 3d/3dA (i.e., cannot determine whether it is Legacy DMRS or non-Legacy DMRS), base station 100 no longer has to decode data according to a plurality of data mapping sequences in consideration of a plurality of different data mapping patterns. In addition, even when terminal 200 transmits a PUSCH with a legacy DMRS pattern, there is a possibility that base station 100 can correctly decode the data in a data mapping sequence assuming Reduced DMRS. Thus, the configuration of receiver in base station 100 can be simplified and processing delay in decoding can be shortened.

The embodiments of the present disclosure have been described above.

Additional Embodiments

Figures 28A, 28B:
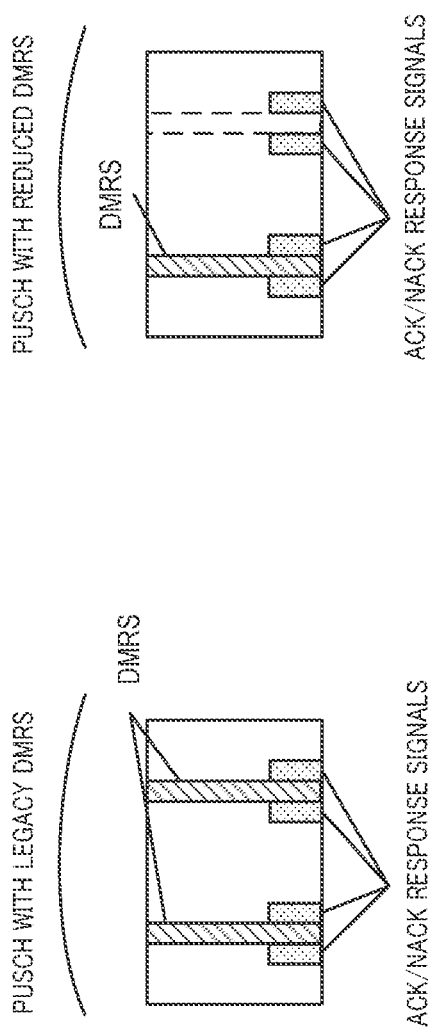
FIGS. 28A and 28B are diagrams each illustrating a DMRS pattern in case of multiplexing with ACK/NACK, according to an additional embodiment of the present disclosure.

[1] When the transmission timing of ACK/NACK response signal for downlink data and the transmission timing of a PUSCH indicated by a UL grant are the same, the ACK/NACK response signal is replaced with data in a PUSCH subframe. Since this ACK/NACK response signal is required to have high judgment accuracy (low error rate), it is defined that an ACK/NACK response signal is mapped to an SC-FDMA symbol adjacent to a DMRS in Rel. 11 or before. Meanwhile, when Reduced DMRS is used, DMRSs are partially replaced with data. Accordingly, there arises a possibility that an ACK/NACK response signal cannot be mapped to an SC-FDMA symbol adjacent to a DMRS, which results in failure of ensuring channel estimation accuracy with respect to the judgment of the ACK/NACK response signal. FIGS. 28A and 28B illustrate examples of how ACK/NACK response signals are mapped in Legacy DMRS (see, FIG. 28A) and in Reduced DMRS (see, FIG. 28B) in a PUSCH. For example, reduce DMRS pattern (1) illustrated in FIG. 4B is used in FIG. 28B, and it is possible to observe that the ACK/NACK response signals are mapped to the positions away from the DMRS.

Accordingly, when an ACK/NACK response signal is multiplexed on a PUSCH, terminal 200 may be configured to always use Legacy DMRS even if Reduced DMRS is indicated. With this configuration, the channel estimation accuracy with respect to the judgment of ACK/NACK response signals can be kept at the same level in Rel. 11 and before.

Alternatively, Reduced DMRS usable when an ACK/NACK response signal is multiplexed on a PUSCH may be limited to a pattern in which a DMRS is mapped to an SC-FDMA symbol adjacent to an ACK/NACK response signal. The pattern in which a DMRS is mapped to an SC-FDMA symbol adjacent to an ACK/NACK response signal is reduced DMRS pattern (3) illustrated in FIG. 4D, for example. With this configuration, degradation of channel estimation accuracy with respect to the judgment of ACK/NACK response signals can be minimized.

Alternatively, when Reduced DMRS is used, the mapping positions of ACK/NACK response signals may be changed. In the example illustrated in FIG. 28B, for example, the ACK/NACK response signals may be mapped concentratedly to positions near the remaining DMRS in Reduced DMRS. As a result, Reduced DMRS can be flexibly used while the channel estimation accuracy with respect to the judgment of ACK/NACK response signals can be ensured.

[2] The above-noted embodiments have been described by examples of hardware implementations, but the present disclosure can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal according to an aspect of this disclosure includes: a reception section that receives uplink control information; a control section that determines a specific mapping pattern based on the control information from among a plurality of mapping patterns for an uplink demodulation reference signal (DMRS); and a generation section that generates a DMRS according to the specific mapping pattern.

In the terminal according to an aspect of this disclosure, the control information includes information indicating the specific mapping pattern.

In the terminal according to an aspect of this disclosure, the information indicating the specific mapping pattern indicates the specific mapping pattern and a virtual cell ID.

In the terminal according to an aspect of this disclosure: the plurality of mapping patterns are associated respectively with values of uplink allocation information included in the control information; and the control section determines a mapping pattern corresponding to the received assignment information as the specific mapping pattern.

In the terminal according to an aspect of this disclosure: the plurality of mapping patterns include a first mapping pattern and a second mapping pattern that includes a smaller amount of resource to which a DMRS is mapped than the first mapping pattern; the allocation information indicating an odd number of allocation resource blocks is associated with the first mapping pattern; and the allocation information indicating an even number of allocation resource blocks is associated with the second mapping pattern.

In the terminal according to an aspect of this disclosure: the plurality of mapping patterns include a first mapping pattern and a second mapping pattern that includes a smaller amount of resource to which a DMRS is mapped than the first mapping pattern; the allocation information indicating an odd number of allocation resource blocks is associated with the number of allocation resource blocks equal to the odd number plus or minus one and the second mapping pattern; and the allocation information indicating an even number of resource blocks is associated with allocation of the even number of resource blocks and the first mapping pattern.

The terminal according to an aspect of this disclosure: the plurality of mapping patterns include a first mapping pattern and a second mapping pattern that includes a smaller amount of resource to which a DMRS is mapped than the first mapping pattern; the allocation information indicating an allocation bandwidth equal to or less than a predetermined value is associated with the first mapping pattern; and the allocation information indicating an allocation bandwidth greater than the predetermined value is associated with the second mapping pattern.

The terminal according to an aspect of this disclosure: the plurality of mapping patterns include a first mapping pattern and a second mapping pattern that includes a smaller amount of resource to which a DMRS is mapped than the first mapping pattern; the allocation information indicating that the lowest frequency of an allocation band is greater than a predetermined value is associated with the first mapping pattern; and the allocation information indicating that the lowest frequency of an allocation band is equal to or less than the predetermined value is associated with the second mapping pattern.

In the terminal according to an aspect of this disclosure, the plurality of mapping patterns are associated respectively with values of the allocation information corresponding to bandwidths other than a bandwidth allocatable by the allocation information.

In the terminal according to an aspect of this disclosure: the plurality of mapping patterns are associated respectively with values of Aperiodic SRS trigger included in the control information; and the control section determines a mapping pattern corresponding to the received Aperiodic SRS trigger, as the specific mapping pattern.

In the terminal according to an aspect of this disclosure: the plurality of mapping patterns are associated respectively with a plurality of control channels used for transmission of the control information; and the control section determines a mapping pattern corresponding to a control channel that has been used for transmission of the control information, as the specific mapping pattern.

In the terminal according to an aspect of this disclosure: the plurality of mapping patterns include a first mapping pattern and a second mapping pattern that includes a smaller amount of resource to which a DMRS is mapped than the first mapping pattern; a control channel used for transmission of the control information by a macro cell base station is associated with the first mapping pattern; and a control channel used for transmission of the control information by a small cell base station is associated with the second mapping pattern.

In the terminal according to an aspect of this disclosure: the plurality of mapping patterns are associated respectively with values of a cyclic shift indicator that is included in the control information and that indicates a cyclic shift value and an orthogonal cover code; and the control section determines a mapping pattern corresponding to the received cyclic shift indicator, as the specific mapping pattern.

In the terminal according to an aspect of this disclosure: the plurality of mapping patterns include a first mapping pattern and a second mapping pattern that includes a smaller amount of resource to which a DMRS is mapped than the first mapping pattern; the control section determines a mapping pattern corresponding to the received cyclic shift indicator as the specific mapping pattern when transmission rank is one; and the control section determines the first mapping pattern as the specific mapping pattern when transmission rank is two or greater.

In the terminal according to an aspect of this disclosure: the control information includes information indicating the specific mapping pattern and uplink allocation information; and the information indicating the specific mapping pattern is subjected to scrambling different from scrambling used for the allocation information.

A base station according to an aspect of this disclosure includes: a control signal generating section that generates uplink control information based on a mapping pattern to be indicated to a terminal from among a plurality of mapping patterns for an uplink demodulation reference signal (DMRS); and a transmission section that transmits the generated control information.

A method of generating a demodulation reference signal (DMRS), according to an aspect of this disclosure includes: receiving uplink control information; determining a specific mapping pattern based on the control information from among a plurality of mapping patterns for an uplink DMRS; and generating a DMRS according to the specific mapping pattern.

A transmission method according to an aspect of this disclosure includes: generating uplink control information based on a mapping pattern to be indicated to a terminal from among a plurality of mapping patterns for an uplink demodulation reference signal (DMRS); and transmitting the generated control information.

INDUSTRIAL APPLICABILITY

The present disclosure is applicable to mobile communication systems.

REFERENCE SIGNS LIST

100 Base station
200 Terminal
11 Control signal generating section
12, 25 Transmission section
13, 21 Reception section
14, 114 Channel estimating section
15 Reception signal processing section
101, 23, 205 Control section
102 Control information generating section
103, 206 Coding section
104, 207 Modulation section
105, 212 Mapping section
106, 213 IFFT section
107, 214 CP adding section
108, 215 Radio transmitting section
109, 201 Radio receiving section
110, 202 CP removing section
111, 203 FFT section
112 Demapping section
113 CSI measuring section
115 Equalization section
116 IDFT section
117 Demodulation section
118 Decoding section
119 Determination section
22, 204 Control signal extracting section
24, 208 DMRS generating section
209 SRS generating section
210 Multiplexing section
211 DFT section

The invention claimed is:
1. A communication apparatus comprising:
a transmitter, which, in operation, transmits, to a terminal, control information which is used for scheduling of a PUSCH (Physical Uplink Shared Channel) and which includes information for determining a mapping pattern of an uplink DMRS (Demodulation Reference Signal) to resource elements;
a receiver, which, in operation, receives, from the terminal, the uplink DMRS, which is mapped to the resource elements based on the information, wherein the mapping pattern is determined out of a plurality of mapping patterns based on the information, and the plurality of mapping patterns include at least two mapping patterns in which numbers of symbols, to which the uplink DMRS is mapped, are different.

2. The communication apparatus according to claim 1, wherein the plurality of mapping patterns include at least two mapping patterns in which numbers of resource elements, to which the uplink DMRS is mapped, are different.

3. The communication apparatus according to claim 1, wherein the plurality of mapping patterns include at least two mapping patterns in which numbers of symbols of a slot or a subframe, to which the uplink DMRS is mapped, are different.

4. The communication apparatus according to claim 1, wherein the plurality of mapping patterns include a mapping pattern in which a number of resources, to which the uplink DMRS is mapped, is less than a number of resources to which an uplink DMRS in LTE-A Release 11 is mapped.

5. The communication apparatus according to claim 1, wherein the plurality of mapping patterns are signaled by a higher-layer.

6. The communication apparatus according to claim 1, wherein the plurality of mapping patterns include a mapping pattern that maps the uplink DMRS having a sequence length less than a frequency bandwidth, to which the PUSCH is assigned.

7. The communication apparatus according to claim 1, wherein the plurality of mapping patterns respectively correspond to either a hopping is enabled or disabled.

8. The communication apparatus according to claim 1, wherein the control information includes information for determining a cyclic shift and an orthogonal sequence, and the receiver, in operation, receives the uplink DMRS generated based on the determined cyclic shift and the determined orthogonal sequence.

9. The communication apparatus according to claim 1, wherein when ACK/NACK is transmitted multiplexed with the PUSCH, the receiver, in operation, receives the ACK/NACK mapped adjacent to the uplink DMRS.

10. A communication method comprising:
transmitting, to a terminal, control information which is used for scheduling of a PUSCH (Physical Uplink Shared Channel) and which includes information for determining a mapping pattern of an uplink DMRS (Demodulation Reference Signal) to resource elements;
receiving, from the terminal, the uplink DMRS, which is mapped to the resource elements based on the information,
wherein the mapping pattern is determined out of a plurality of mapping patterns based on the information, and the plurality of mapping patterns include at least two mapping patterns in which numbers of symbols, to which the uplink DMRS is mapped, are different.

11. The communication method according to claim 10, wherein the plurality of mapping patterns include at least two mapping patterns in which numbers of resource elements, to which the uplink DMRS is mapped, are different.

12. The communication method according to claim 10, wherein the plurality of mapping patterns include at least two mapping patterns in which numbers of symbols of a slot or a subframe, to which the uplink DMRS is mapped, are different.

13. The communication method according to claim 10, wherein the plurality of mapping patterns include a mapping pattern in which a number of resources, to which the uplink DMRS is mapped, is less than a number of resources to which an uplink DMRS in LTE-A Release 11 is mapped.

14. The communication method according to claim 10, wherein the plurality of mapping patterns are signaled by a higher-layer.

15. The communication method according to claim 10, wherein the plurality of mapping patterns include a mapping pattern that maps the uplink DMRS having a sequence length less than a frequency bandwidth, to which the PUSCH is assigned.

16. The communication method according to claim 10, wherein the plurality of mapping patterns respectively correspond to either a hopping is enabled or disabled.

17. The communication method according to claim 10, wherein the control information includes information for determining a cyclic shift and an orthogonal sequence, and the receiving includes receiving the uplink DMRS generated based on the determined cyclic shift and the determined orthogonal sequence.

18. The communication method according to claim 10, wherein when ACK/NACK is transmitted multiplexed with the PUSCH, the receiving includes receiving the ACK/NACK mapped adjacent to the uplink DMRS.

* * * * *